United States Patent
Lo et al.

(10) Patent No.: US 11,838,787 B2
(45) Date of Patent: Dec. 5, 2023

(54) FUNCTIONAL ARCHITECTURE AND INTERFACE FOR NON-REAL-TIME RAN INTELLIGENT CONTROLLER

(71) Applicant: Samsung Electronics Co., Ltd., Suwon-si (KR)

(72) Inventors: Caleb K. Lo, San Jose, CA (US); Pranav Madadi, Mountain View, CA (US); Jeongho Jeon, San Jose, CA (US); Joonyoung Cho, Portland, OR (US); Junhyuk Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 83 days.

(21) Appl. No.: 17/236,895

(22) Filed: Apr. 21, 2021

(65) Prior Publication Data

US 2021/0337420 A1 Oct. 28, 2021

Related U.S. Application Data

(60) Provisional application No. 63/057,148, filed on Jul. 27, 2020, provisional application No. 63/051,346, (Continued)

(51) Int. Cl.
*H04W 28/02* (2009.01)
*G06F 9/50* (2006.01)

(52) U.S. Cl.
CPC ...... *H04W 28/0263* (2013.01); *G06F 9/5083* (2013.01); *H04W 28/0284* (2013.01)

(58) Field of Classification Search
CPC ......... H04W 28/0263; H04W 28/0284; G06G 9/5083
See application file for complete search history.

(56) References Cited

U.S. PATENT DOCUMENTS 11,064,425 B1 * 7/2021 Cui .................. H04W 48/18
11,336,538 B2 * 5/2022 Akman ............. H04L 41/147
(Continued)

FOREIGN PATENT DOCUMENTS

WO 2018/031057 A1 2/2018

OTHER PUBLICATIONS

International Search Report and Written Opinion of the International Searching Authority in connection with International Application No. PCT/KR2021/005100 dated Jul. 22, 2021, 7 pages.
(Continued)

*Primary Examiner* — Parth Patel

(57) ABSTRACT

A service management and orchestration (SMO) entity enabling a functional split between a non-real-time (RT) radio access network (RAN) intelligent controller (RIC) and an external artificial intelligence (AI)/machine learning (ML) server will, during a data collection phase, utilize the SMO entity and the non-RT RIC to collect and process RAN data and non-RAN data and, during a data transfer phase, transfer processed RAN and non-RAN data from the SMO entity to an external AI/ML server via an interface. During a training model input phase, the SMO entity receives a trained AI/ML model, metadata, and training results from the external AI/ML server via an interface and, during a configuration phase, the SMO entity uses the trained AI/ML model within the SMO entity and the non-RT RIC to transfer configuration parameters to a near-RT RIC.

12 Claims, 22 Drawing Sheets

Related U.S. Application Data filed on Jul. 13, 2020, provisional application No. 63/050,512, filed on Jul. 10, 2020, provisional application No. 63/020,692, filed on May 6, 2020, provisional application No. 63/014,040, filed on Apr. 22, 2020.

(56) References Cited

U.S. PATENT DOCUMENTS

| | | | |
|---|---|---|---|
| 2020/0106536 A1* | 4/2020 | Bedekar | G06N 3/0454 |
| 2020/0314826 A1* | 10/2020 | Sharma | H04B 7/0695 |
| 2020/0329381 A1* | 10/2020 | Chou | H04W 16/10 |
| 2021/0184989 A1* | 6/2021 | Wu | H04L 47/822 |
| 2021/0234803 A1* | 7/2021 | Parekh | H04W 72/1236 |
| 2021/0235277 A1* | 7/2021 | Parekh | H04W 16/14 |
| 2021/0235323 A1* | 7/2021 | Parekh | H04W 28/16 |
| 2021/0235451 A1* | 7/2021 | Parekh | H04W 72/1215 |
| 2021/0235473 A1* | 7/2021 | Parekh | H04W 72/04 |
| 2021/0266907 A1* | 8/2021 | Cui | G06N 20/00 |
| 2021/0297876 A1* | 9/2021 | Bellamkonda | H04L 41/0823 |
| 2021/0337420 A1* | 10/2021 | Lo | H04L 41/5009 |
| 2022/0116799 A1* | 4/2022 | Wang | H04W 8/24 |
| 2022/0278717 A1* | 9/2022 | Tsui | H04L 25/0202 |
| 2022/0295309 A1* | 9/2022 | Akhtar | H04W 64/00 |
| 2022/0322111 A1* | 10/2022 | Zhang | H04L 41/16 |
| 2023/0014932 A1* | 1/2023 | Huang | H04W 24/02 |

OTHER PUBLICATIONS

O-RAN Alliance, "O-RAN Use Cases and Deployment Scenarios", Towards Open and Smart RAN, White Paper, Feb. 2020, 27 pages.

Ferrus et al., "Applicability Domains of Machines Learning in Next Generation Radio Access Networks", 2019 International Conference on Computational Science and Computational Intelligence (CSCI), Las Vegas, NV, USA, Dec. 5-7, 2019, 9 pages.

O-RAN Alliance, "O-RAN: Towards an Open and Smart RAN", White Paper, Oct. 2018, 19 pages.

Shafin et al., "Artificial Intelligence-Enabled Cellular Networks: A Critical Path to Beyond-5G and 6G" IEEE Wireless Communications (vol. 27, Issue: 2, Apr. 2020) Published: Mar. 8 2020, 7 pages.

Samsung Electronics Co., Ltd., "Discussion for Non-RT RIC AI/ML Functional Split", O-RAN Alliance, O-RAN WG2, May 2020, 8 pages.

Partial European Search Report dated Jul. 27, 2023 regarding Application No. 21793100.5, 27 pages.

"O-RAN Working Group 2 AI/ML workflow description and requirements", O-RAN.WG2.AIML-v01.01 Technical Report, Apr. 2020, 47pages.

"O-RAN Working Group 2 (Non-RT RIC & AI interface)", ORAN-WG2.Use Case Requirements v01.00, Technical Specification, Jun. 2019, 29 pages.

* cited by examiner

FUNCTIONAL ARCHITECTURE AND INTERFACE FOR NON-REAL-TIME RAN INTELLIGENT CONTROLLER

CROSS-REFERENCE TO RELATED APPLICATION AND CLAIM OF PRIORITY

This application claims priority under 35 U.S.C. § 119(e) to U.S. Provisional Patent Application No. 63/014,040 filed Apr. 22, 2020, U.S. Provisional Patent Application No. 63/020,692 filed May 6, 2020, U.S. Provisional Patent Application No. 63/050,512 filed Jul. 10, 2020, U.S. Provisional Patent Application No. 63/051,346 filed Jul. 13, 2020, and U.S. Provisional Patent Application No. 63/057,148 filed Jul. 27, 2020. The above-identified patent documents are incorporated herein by reference.

TECHNICAL FIELD

The present disclosure relates generally to the functional architecture of a non-real-time (RT) radio access network (RAN) intelligent controller (RIC) and, more specifically, to enhancing artificial intelligence (AI)/machine learning (ML) lifecycle management.

BACKGROUND

In order to facilitate AI/ML lifecycle management, the possibility of a functional split of the non-RT RIC should be considered. Without such a functional split, AI/ML lifecycle management would be more difficult since the non-RT RIC would be more ML-specific, and it would be difficult to adapt an ML-specific non-RT RIC to support a wide range of future applications. Several options for a functional split between non-RT RIC, the service management and orchestration (SMO) entity, and non-SMO entities are disclosed herein, as well as the functionality of an external AI/ML server. Furthermore, details on the interface between non-RT RIC and AI/ML server are disclosed including information element(s) to be exchanged over the interface.

SUMMARY

In one embodiment, a method at a service management and orchestration (SMO) entity of enabling a functional split between a non-real-time (RT) radio access network (RAN) intelligent controller (RIC) and an external artificial intelligence (AI)/machine learning (ML) server comprises: during a data collection phase, utilizing the SMO entity and the non-RT RIC to collect and process RAN data and non-RAN data; during a data transfer phase, transferring processed RAN and non-RAN data from the SMO entity to an external AI/ML server via an interface; during a training model input phase, receiving a trained AI/ML model, metadata, and training results from the external AI/ML server at the SMO entity via an interface; and during a configuration phase, using the trained AI/ML model within the SMO entity and the non-RT RIC to transfer configuration parameters to a near-RT RIC.

Within the method, transferring processed RAN and non-RAN data optionally comprises: transferring pointers to processed RAN and non-RAN data in a data store, wherein the pointers are configured for use in the external AI/ML server to retrieve the processed RAN and non-RAN data.

Within the method, the external AI/ML server may be a general AI/ML entity, the functional split may be enabled between the non-RT RIC and the general AI/ML entity, and the general AI/ML entity may train the AI/ML model.

The method may further comprise utilizing defined control signaling to collect the RAN data and non-RAN data, where the trained AI/ML model and configuration parameters enable intelligent beam management procedures.

In a second embodiment, a method of mediating transfer of enrichment information (EI) at a non-real-time (RT) radio access network (RAN) intelligent controller (RIC) to a near-RT RIC comprises: establishing a connection between the non-RT RIC and the near-RT RIC for delivery of the EI; determining, by the non-RT RIC, whether the EI satisfies defined bounds; and transferring an error notification by the non-RT RIC and removing access of the near-RT RIC to the EI in case that the defined bounds are not satisfied.

Within the method, the EI used to determine that the EI does not satisfy the defined bounds may be one of generated by a non-RT RIC application (rApp) or received from an external source and, in case that the EI is received from the external source, the method may further comprise transferring the error notification to the external source, while, in case that the EI is generated by the rApp, the method may further comprise suspending and undeploying the rApp before sending a command to the external AI/ML server to retrain the rApp.

Within the method, establishing the connection between the non-RT RIC and the near-RT RIC for delivery of the EI may comprise establishing the connection for continuous delivery of the EI, and the method may further comprise: determining, by the non-RT RIC, a target set of key performance indicators (KPIs) for the EI; continuously transferring the EI from the non-RT RIC to the near-RT RIC; monitoring, by the non-RT RIC, the target KPIs; and determining whether any KPI in the set of target KPIs does not satisfy predefined bounds associated with the KPI.

In a third embodiment, a service management and orchestration (SMO) entity enabling a functional split between a non-real-time (RT) radio access network (RAN) intelligent controller (RIC) and an external artificial intelligence (AI)/machine learning (ML) server comprises a transceiver and a processor coupled to the transceiver, the processor configured to: during a data collection phase, operate with the non-RT RIC to collect and process RAN data and non-RAN data; during a data transfer phase, transfer processed RAN and non-RAN data from the SMO entity to an external AI/ML server via an interface; during a training model input phase, receive a trained AI/ML model, metadata, and training results from the external AI/ML server at the SMO entity via an interface; and during a configuration phase, use the trained AI/ML model within the SMO entity and the non-RT RIC to transfer configuration parameters to a near-RT RIC.

Within the SMO entity, transferring processed RAN and non-RAN data may comprise: transferring pointers to processed RAN and non-RAN data in a data store, wherein the pointers are configured for use in the external AI/ML server to retrieve the processed RAN and non-RAN data.

Within the SMO entity, the external AI/ML server may be a general AI/ML entity, the functional split may be enabled between the non-RT RIC and the general AI/ML entity, and the general AI/ML entity may train the AI/ML model.

Within the SMO entity, the processor may be further configured to: utilize defined control signaling to collect the RAN data and non-RAN data, wherein the trained AI/ML model and configuration parameters enable intelligent beam management procedures.

In a fourth embodiment, a non-real-time (RT) radio access network (RAN) intelligent controller (RIC) mediating transfer of enrichment information (EI) to a near-RT RIC comprises a transceiver and a processor coupled to the transceiver, the processor configured to: establish a connection between the non-RT RIC and the near-RT RIC for delivery of the EI; determine, by the non-RT RIC, whether the EI satisfies defined bounds; and transfer an error notification by the non-RT RIC and removing access of the near-RT RIC to the EI in case that the defined bounds are not satisfied.

Within the non-RT RIC, the EI used to determine that the EI does not satisfy the defined bounds may be one of generated by a non-RT RIC application (rApp) or received from an external source, and the processor may be further configured to: in case that the EI is received from the external source, transfer the error notification to the external source; and in case that the EI is generated by the rApp, suspend and undeploy the rApp before sending a command to the external AI/ML server to retrain the rApp.

Within the non-RT RIC, establishing the connection between the non-RT RIC and the near-RT RIC for delivery of the EI may comprise establishing the connection for continuous delivery of the EI, and the processor may be further configured to: determine, by the non-RT RIC, a target set of key performance indicators (KPIs) for the EI; continuously transfer the EI from the non-RT RIC to the near-RT RIC; monitor, by the non-RT RIC, the target KPIs; and determine whether any KPI in the set of target KPIs does not satisfy predefined bounds associated with the KPI.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. Likewise, the term "set" means one or more. Accordingly, a set of items can be a single item or a collection of two or more items.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

The figures included herein, and the various embodiments used to describe the principles of the present disclosure are by way of illustration only and should not be construed in any way to limit the scope of the disclosure. Further, those skilled in the art will understand that the principles of the present disclosure may be implemented in any suitably arranged wireless communication system.

Figure 1:
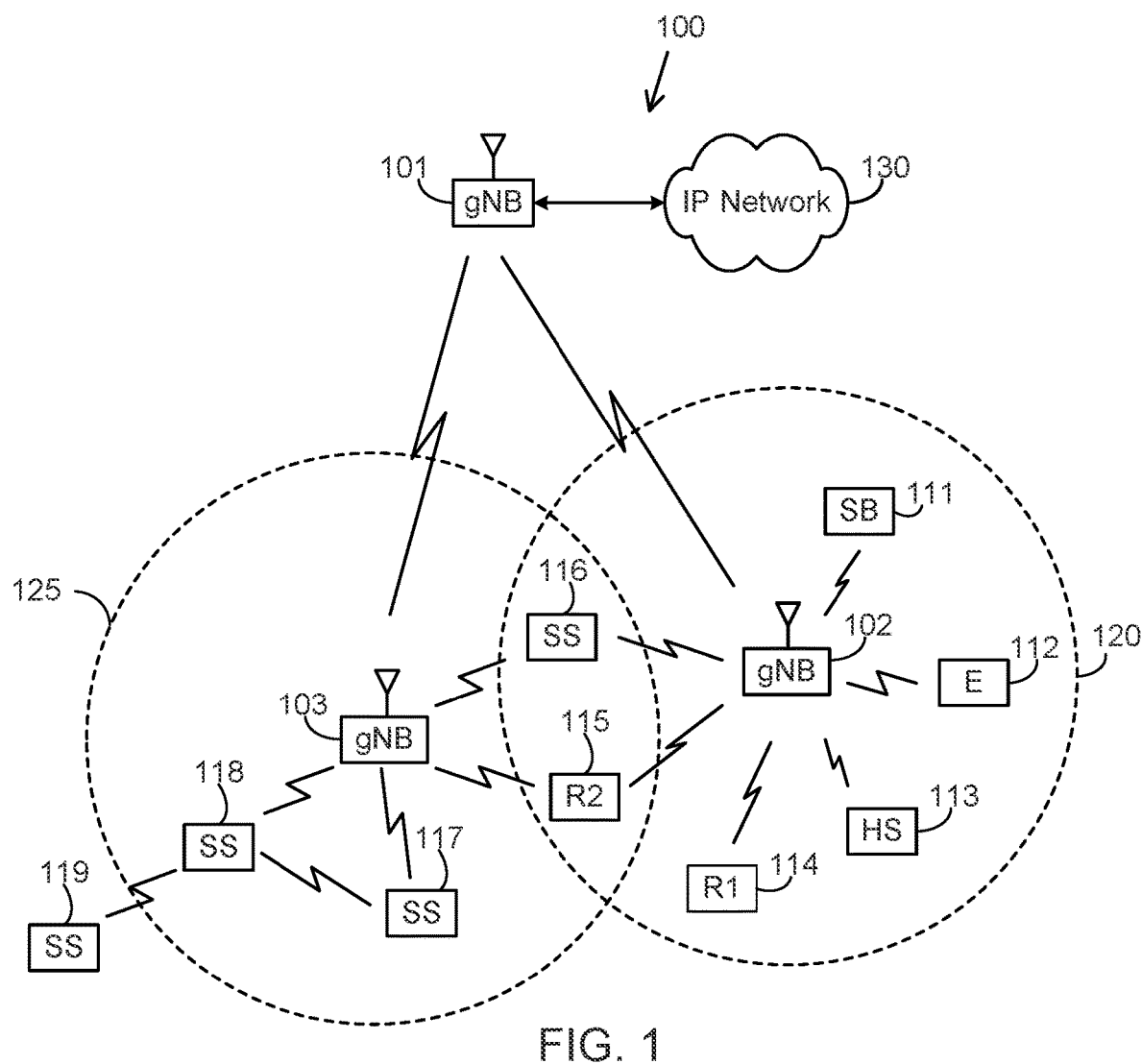
FIG. 1 illustrates an example wireless network within which a functional architecture and interface for a non-RT RIC may be implemented according to embodiments of the present disclosure.
Figure 2:
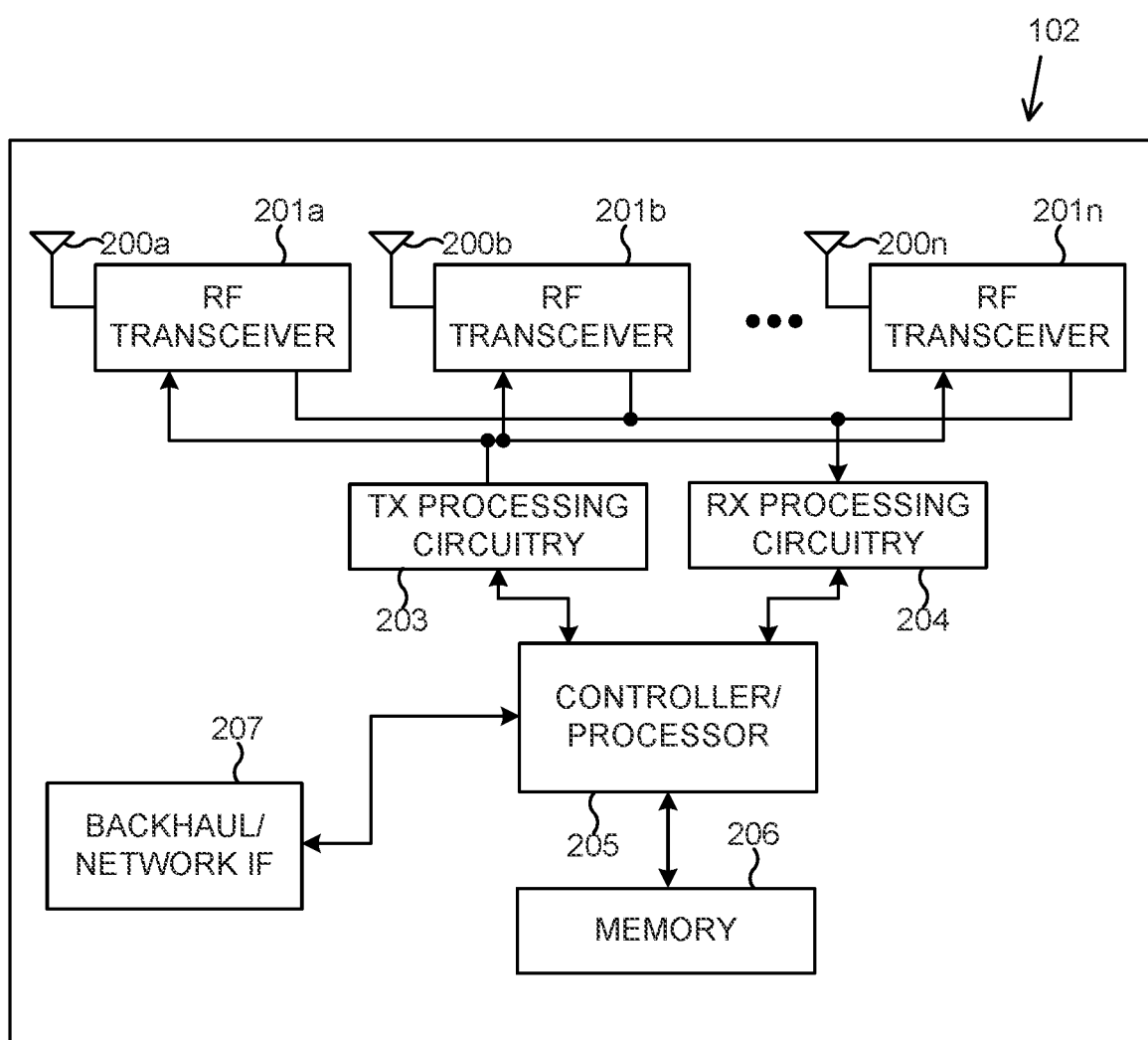
FIG. 2 illustrates an example base station for an example wireless network within which a functional architecture and interface for a non-RT RIC may be implemented according to embodiments of the present disclosure.
Figure 3:
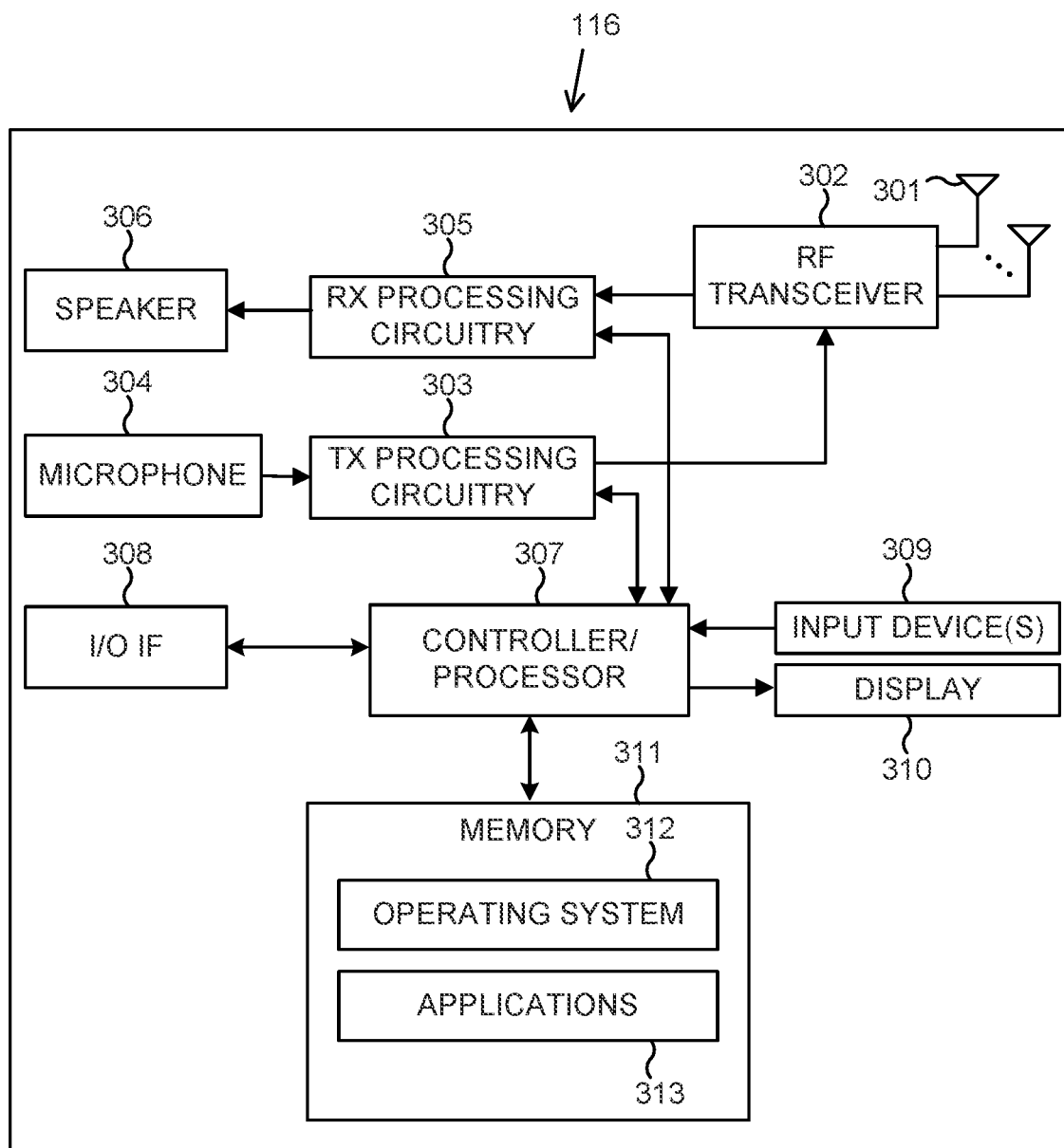
FIG. 3 illustrates an example user equipment for an example wireless network within which a functional architecture and interface for a non-RT RIC may be implemented according to embodiments of the present disclosure.

FIGS. 1-3 below describe various embodiments of the present disclosure implemented in wireless communications systems. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network within which a functional architecture and interface for a non-RT RIC may be implemented according to embodiments of the present disclosure. The embodiment of the wireless network shown in FIG. 1 is for illustration only. Other embodiments of the wireless network 100 could be used without departing from the scope of the present disclosure.

As shown in FIG. 1, the wireless network includes a base station (gNB or gNodeB) 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R1); a UE 115, which may be located in a second residence (R2); and a UE 116, which may be a mobile device (M), such as a cell phone, a wireless laptop, a wireless personal digital assistant (PDA), or the like. The gNB 103 provides wireless broadband access to the network 130 for a second plurality of UEs within a coverage area 125 of the gNB 103. The second plurality of UEs includes the UE 115 and the UE 116, as well as subscriber stations (SS, for example, UEs) 117, 118 and 119. In some embodiments, one or more of the gNBs 101-103 may communicate with each other and with the UEs 111-116 using existing wireless communication techniques, and one or more of the UE 111-119 may communicate directly with each other (e.g., UEs 117-119) using other existing or proposed wireless communication techniques.

Depending on the network type, the term "base station" or "BS" can refer to any component (or collection of components) configured to provide wireless access to a network, such as transmit point (TP), transmit-receive point (TRP), an enhanced (or "evolved") base station (eNodeB or eNB), a 5G base station (gNB), a macrocell, a femtocell, a wireless fidelity (WiFi) access point (AP), or other wirelessly enabled devices. Base stations may provide wireless access in accordance with one or more wireless communication protocols, e.g., 5G 3GPP New Radio (NR) interface/access, Long Term Evolution (LTE), LTE Advanced (LTE-A), high speed packet access (HSPA), Wi-Fi 802.11a/b/g/n/ac, etc. For the sake of convenience, the various names for a base station-type apparatus and functionality are used interchangeably in this patent document to refer to network infrastructure components that provide wireless access to remote terminals. Also, depending on the network type, the term "user equipment" (UE) can refer to any component such as a mobile station (MS), subscriber station (SS), remote terminal, wireless terminal, receive point, or user device. For the sake of convenience, the various names for a user equipment-type device and functionality are used interchangeably in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-119 include circuitry, programing, or a combination thereof, for efficient signaling of control message for fronthaul interface. In certain embodiments, and one or more of the gNBs 101-103 includes circuitry, programing, or a combination thereof, for CSI acquisition based on space-frequency compression in an advanced wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example base station for an example wireless network within which a functional architecture and interface for a non-RT RIC may be implemented according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of the present disclosure to any particular implementation of a gNB.

As shown in FIG. 2, the gNB 102 includes multiple antennas 200a-200n, multiple radio frequency (RF) transceivers 201a-201n, transmit (TX) processing circuitry 203, and receive (RX) processing circuitry 204. The gNB 102 also includes a controller/processor 205, a memory 206, and a backhaul or network interface 207.

The RF transceivers 201a-201n receive, from the antennas 200a-200n, incoming RF signals, such as signals transmitted by UEs in the network 100. The RF transceivers 201a-201n down-convert the incoming RF signals to generate intermediate frequency (IF) or baseband signals. The IF or baseband signals are sent to the RX processing circuitry 204, which generates processed baseband signals by filtering, decoding, and/or digitizing the baseband or IF signals. The RX processing circuitry 204 transmits the processed baseband signals to the controller/processor 205 for further processing.

The TX processing circuitry 203 receives analog or digital data (such as voice data, web data, electronic mail, or interactive video game data) from the controller/processor 205. The TX processing circuitry 203 encodes, multiplexes, and/or digitizes the outgoing baseband data to generate processed baseband or IF signals. The RF transceivers 201a-201n receive the outgoing processed baseband or IF signals from the TX processing circuitry 203 and up-converts the baseband or IF signals to RF signals that are transmitted via the antennas 201a-201n.

The controller/processor 205 can include one or more processors or other processing devices that control the overall operation of the gNB 102. For example, the controller/processor 205 could control the reception of forward channel signals and the transmission of reverse channel signals by the RF transceivers 201a-201n, the RX processing circuitry 204, and the TX processing circuitry 203 in accordance with well-known principles. The controller/processor 205 could support additional functions as well, such as more advanced wireless communication functions.

For instance, the controller/processor 205 could support beam forming or directional routing operations in which outgoing signals from multiple antennas 200a-200n are weighted differently to effectively steer the outgoing signals in a desired direction. Any of a wide variety of other functions could be supported in the gNB 102 by the controller/processor 205.

The controller/processor 205 is also capable of executing programs and other processes resident in the memory 206, such as an operating system (OS). The controller/processor 205 can move data into or out of the memory 206 as required by an executing process.

The controller/processor 205 is also coupled to the backhaul or network interface 207. The backhaul or network interface 207 allows the gNB 102 to communicate with other devices or systems over a backhaul connection or over a network. The interface 207 could support communications over any suitable wired or wireless connection(s). For example, when the gNB 102 is implemented as part of a cellular communication system (such as one supporting 5G, LTE, or LTE-A), the interface 207 could allow the gNB 102 to communicate with other gNBs over a wired or wireless backhaul connection. When the gNB 102 is implemented as an access point, the interface 207 could allow the gNB 102 to communicate over a wired or wireless local area network or over a wired or wireless connection to a larger network (such as the Internet). The interface 207 includes any suitable structure supporting communications over a wired or wireless connection, such as an Ethernet or RF transceiver.

The memory 206 is coupled to the controller/processor 205. Part of the memory 206 could include a random access memory (RAM), and another part of the memory 206 could include a Flash memory or other read only memory (ROM).

Although FIG. 2 illustrates one example of gNB 102, various changes may be made to FIG. 2. For example, the gNB 102 could include any number of each component shown in FIG. 2. As a particular example, an access point could include a number of interfaces 207, and the controller/processor 205 could support routing functions to route data between different network addresses. As another particular example, while shown as including a single instance of TX processing circuitry 203 and a single instance of RX processing circuitry 204, the gNB 102 could include multiple instances of each (such as one per RF transceiver). Also, various components in FIG. 2 could be combined, further subdivided, or omitted and additional components could be added according to particular needs.

FIG. 3 illustrates an example user equipment for an example wireless network within which a functional architecture and interface for a non-RT RIC may be implemented according to embodiments of the present disclosure. The embodiment of the UE 116 illustrated in FIG. 3 is for illustration only, and the UEs 111-115 and 117-119 of FIG. 1 could have the same or similar configuration. However, UEs come in a wide variety of configurations, and FIG. 3 does not limit the scope of the present disclosure to any particular implementation of a UE.

As shown in FIG. 3, the UE 116 includes an antenna 301, a radio frequency (RF) transceiver 302, TX processing circuitry 303, a microphone 304, and receive (RX) processing circuitry 305. The UE 116 also includes a speaker 306, a controller or processor 307, an input/output (I/O) interface (IF) 308, a touchscreen display 310, and a memory 311. The memory 311 includes an OS 312 and one or more applications 313.

The RF transceiver 302 receives, from the antenna 301, an incoming RF signal transmitted by an gNB of the network 100. The RF transceiver 302 down-converts the incoming RF signal to generate an IF or baseband signal. The IF or baseband signal is sent to the RX processing circuitry 305, which generates a processed baseband signal by filtering, decoding, and/or digitizing the baseband or IF signal. The RX processing circuitry 305 transmits the processed baseband signal to the speaker 306 (such as for voice data) or to the processor 307 for further processing (such as for web browsing data).

The TX processing circuitry 303 receives analog or digital voice data from the microphone 304 or other outgoing baseband data (such as web data, e-mail, or interactive video game data) from the processor 307. The TX processing circuitry 303 encodes, multiplexes, and/or digitizes the outgoing baseband data to generate a processed baseband or IF signal. The RF transceiver 302 receives the outgoing processed baseband or IF signal from the TX processing circuitry 303 and up-converts the baseband or IF signal to an RF signal that is transmitted via the antenna 301.

The processor 307 can include one or more processors or other processing devices and execute the OS 312 stored in the memory 311 in order to control the overall operation of the UE 116. For example, the processor 307 could control the reception of forward channel signals and the transmission of reverse channel signals by the RF transceiver 302, the RX processing circuitry 305, and the TX processing circuitry 303 in accordance with well-known principles. In some embodiments, the processor 307 includes at least one microprocessor or microcontroller.

The processor 307 is also capable of executing other processes and programs resident in the memory 311, such as processes for CSI reporting on uplink channel. The processor 307 can move data into or out of the memory 311 as required by an executing process. In some embodiments, the processor 307 is configured to execute the applications 313 based on the OS 312 or in response to signals received from gNBs or an operator. The processor 307 is also coupled to the I/O interface 309, which provides the UE 116 with the ability to connect to other devices, such as laptop computers and handheld computers. The I/O interface 309 is the communication path between these accessories and the processor 307.

The processor 307 is also coupled to the touchscreen display 310. The user of the UE 116 can use the touchscreen display 310 to enter data into the UE 116. The touchscreen display 310 may be a liquid crystal display, light emitting diode display, or other display capable of rendering text and/or at least limited graphics, such as from web sites.

The memory 311 is coupled to the processor 307. Part of the memory 311 could include RAM, and another part of the memory 311 could include a Flash memory or other ROM.

Although FIG. 3 illustrates one example of UE 116, various changes may be made to FIG. 3. For example, various components in FIG. 3 could be combined, further subdivided, or omitted and additional components could be added according to particular needs. As a particular example, the processor 307 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
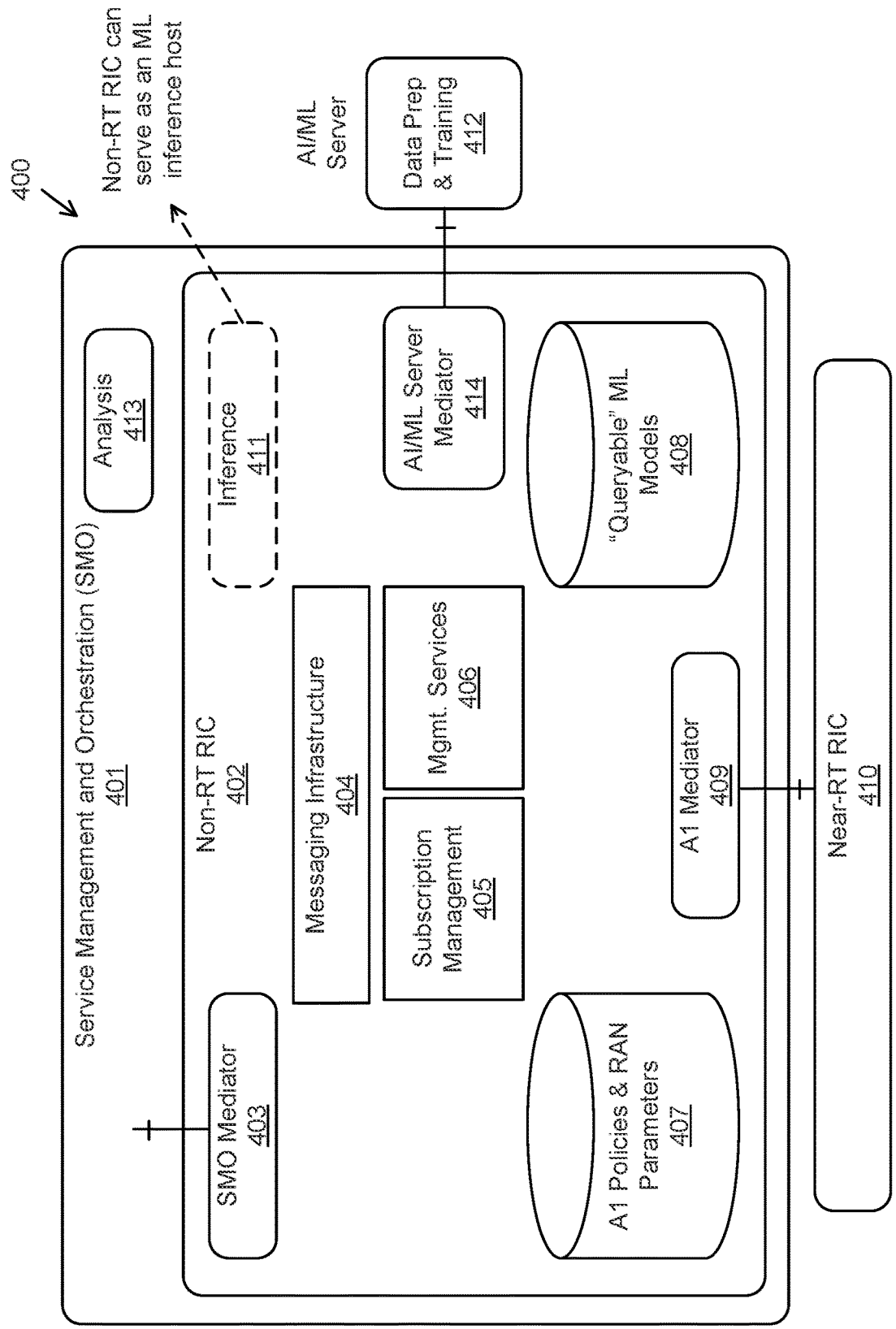
FIGS. 4A and 4B depict two options for the non-RT RIC functional split according to embodiments of the present disclosure.
Figure 4B:
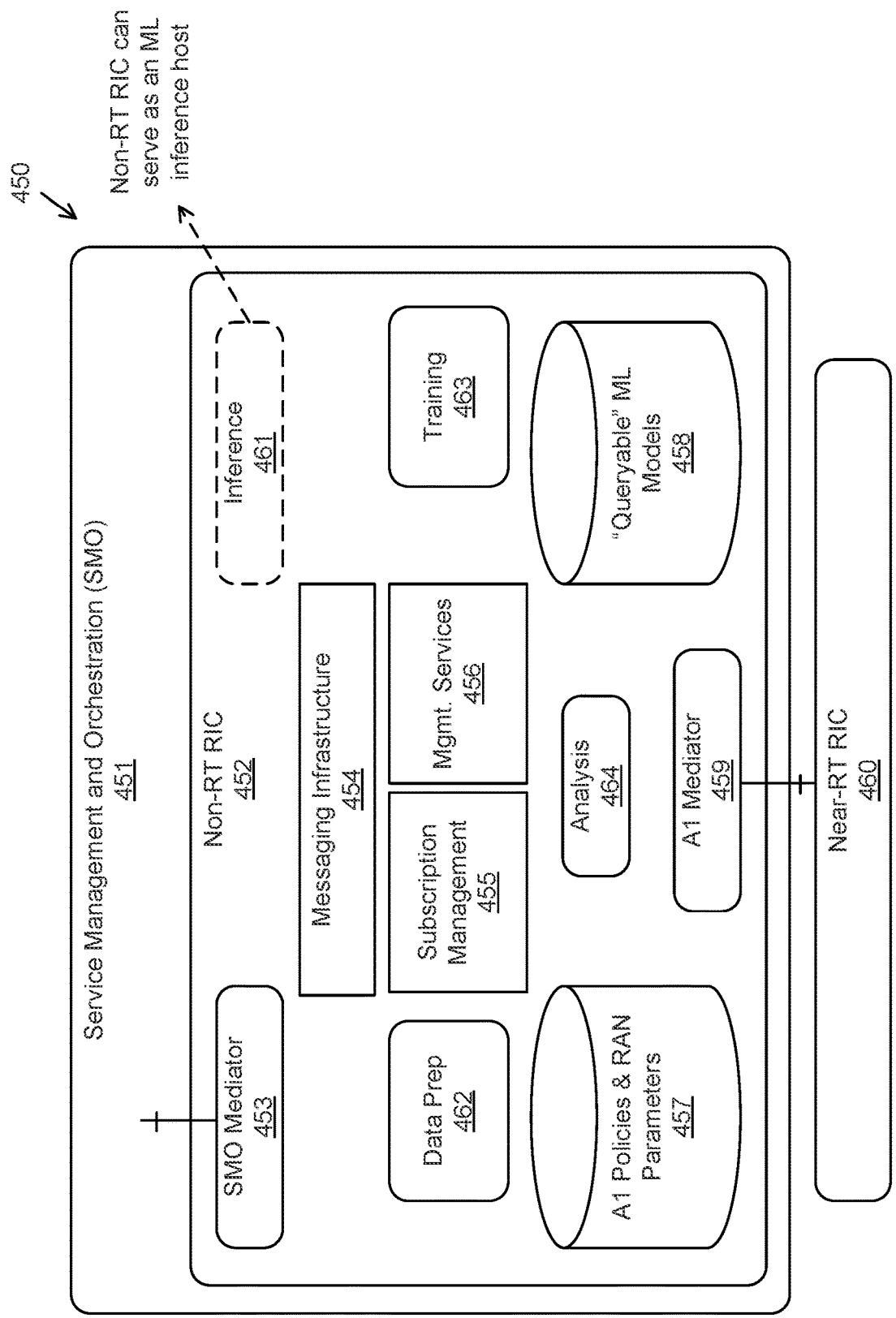

FIGS. 4A and 4B depict two options for the non-RT RIC functional split according to embodiments of the present disclosure. The figures and example options should not be interpreted as a limiting factor of the scope of this disclosure.

For both FIGS. 4A and 4B, the architectures 400, 450 each include a service management and orchestration (SMO) 401, 451 that respectively include the corresponding non-RT RIC 402, 452, each of which in turn includes: an SMO mediator 403, 453; messaging infrastructure 404, 454; subscription management 405, 455; management services 406, 456; an A1 policies and RAN parameters datastore 407, 457; datastore 408, 458 of "queryable" ML models; and an A1 mediator 409, 459 providing an interface to a corresponding near-RT RIC 410, 460.

In the first embodiment, shown in FIG. 4A, the architecture 400 entails placing a data prep module and a training module (which may be combined in AI/ML server 412 as shown) outside the respective SMO 401, and an analysis module 413 outside the non-RT RIC 402. Thus, defining the interface 414 between non-RT RIC 402 and external AI/ML server 412 is necessary, which will be further discussed in the later.

In the second embodiment, shown in FIG. 4B, the architecture 450 entails placing a data prep module 462 inside the non-RT RIC 452, a training module 463 inside the non-RT RIC 452, and an analysis module 464 inside the non-RT RIC 452.

Figure 5:
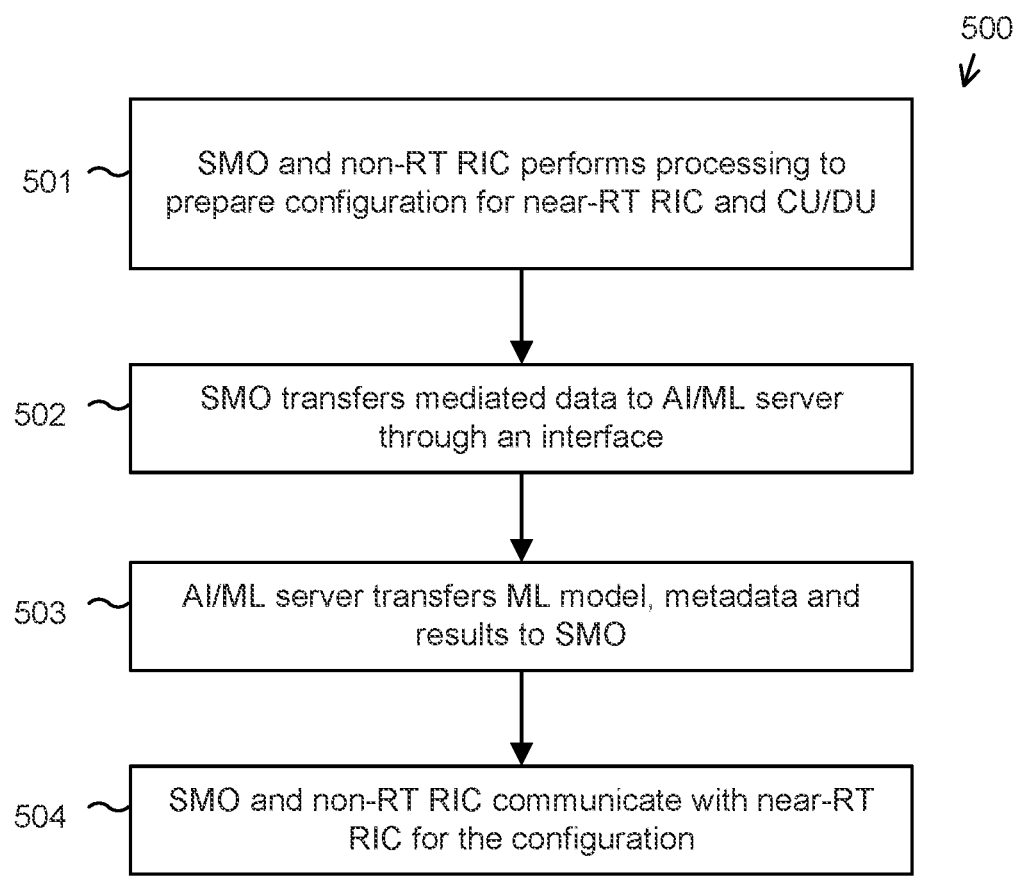
FIG. 5 is an example flow diagram of AI/ML-assisted configuration of a near-RT RIC and a centralized unit (CU)/distributed unit (DU) with the assistance of an AI/ML server according to embodiments of the present disclosure.

An external AI/ML server (in the case of the first option) may possess the following capabilities in part or entirety to support a generic non-RT RIC 402 as exemplified in FIG. 4A:

Data preparation
  Including data selection, fusion, cleaning, etc.
AI/ML modeling
  Including feature extraction, model selection, etc.
AI/ML model training
AI/ML model verification
AI/ML model inference
AI/ML model feedback
AI/ML model training feedback for A1 policies
AI/ML model training feedback for near-RT RIC parameters
AI/ML model training feedback for RAN parameters
Assisting non-RT RIC with AI/ML, model maintenance
  Including metadata with AI/ML model feedback
  Including metadata with AI/ML model training feedback The interface between non-RT RIC 402 and AI/ML server may convey in part of or an entirety of:

SMO data from non-RT RIC to AI/ML server
the following from AI/ML server to non-RT RIC:
  Trained AI/ML models
  Training results for A1 policies
  Training results for RAN/near-RT RIC parameters In addition, the interface between non-RT RIC 402 and AI/ML server may support the following functionalities as well as necessary information exchange:

Support AI/ML lifecycle management in AI/ML server
  Monitoring and analytics may be handled in SMO
Support transfer of mediated SMO data to AI/ML server to enable data prep
  Data prep is necessary for re-training of currently deployed ML model
Support transfer of trained ML model/metadata to non-RT RIC for addition to catalog of "queryable" ML models
  Metadata includes model ID, text description, training error, etc.
Support transfer of training results for generating/optimizing A1 policies to database of A1 policies
  Training results include training error, training dataset ID, timestamp, etc.
Support transfer of training results for configuring RAN/near-RT RIC parameters to database of RAN/near-RT RIC parameters
  Training results include training error, training dataset ID, timestamp, etc.
Support transfer of "re-train" command to AI/ML server based on pre-configured trigger event The following principles only apply if AI/ML server is inference host
  Support transfer of mediated SMO data to AI/ML server to enable inference for currently deployed ML model
  Support retrieval of performance data for currently deployed ML model for addition to catalog of "queryable" ML models
    Performance data includes test error, test dataset ID, timestamp, etc.
  Should support transfer of "fallback" command to AI/ML server based on pre-configured trigger event FIG. 5 is an example flow diagram of AI/ML-assisted configuration of a near-RT RIC and a centralized unit (CU)/distributed unit (DU) with the assistance of an AI/ML server according to embodiments of the present disclosure. At operation 501 of the method 500, the SMO and non-RT RIC process data from the RAN, including management information. At operation 502, the SMO transfers the processed data to an external AI/ML server through an interface. The AI/ML server uses the processed data to train an ML model, then transfers the trained ML model, metadata, and training results to the SMO through an interface, which is described at operation 503. At operation 504, the SMO and non-RT RIC use the trained ML model to communicate with the near-RT RIC in order to configure it and the CU/DU.

Figure 6:
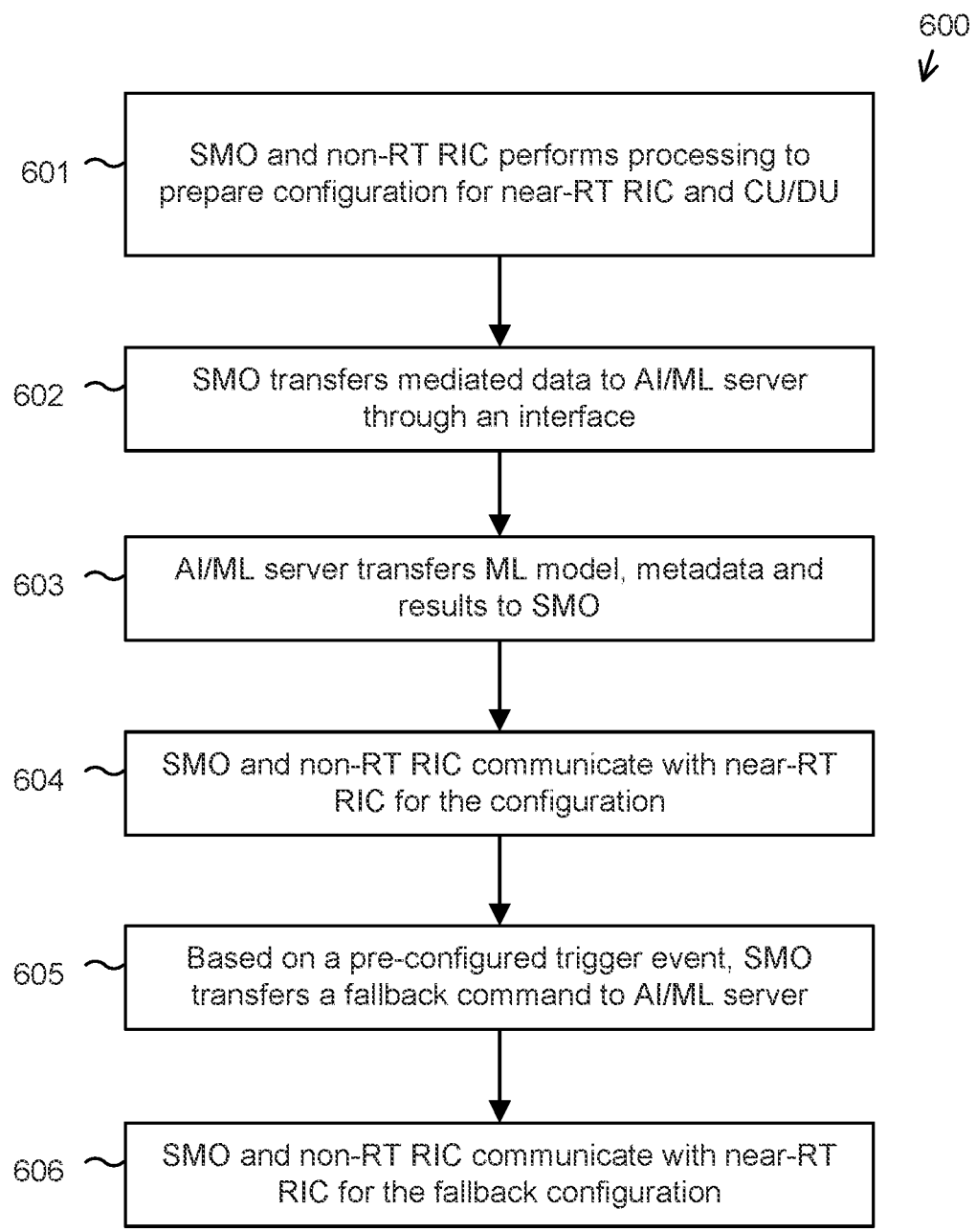
FIG. 6 is an example flow diagram of SMO-initiated fallback procedure for AI/ML server, for enabling the SMO to initiate a fallback procedure to an AI/ML server according to embodiments of the present disclosure.

FIG. 6 is an example flow diagram of SMO-initiated fallback procedure for AI/ML server, for enabling the SMO to initiate a fallback procedure to an AI/ML server according to embodiments of the present disclosure. At operation 601 of method 600, the SMO and non-RT RIC process data from the RAN, including management information. At operation 602, the SMO transfers the processed data to an external AI/ML server through an interface. The AI/ML server uses the processed data to train an ML model; it then transfers the trained ML model, metadata, and training results to the SMO through an interface, which is described at operation 603. At operation 604, the SMO and non-RT RIC use the trained ML model to communicate with the near-RT RIC in order to configure it and the CU/DU. At operation 605, the SMO responds to a pre-configured trigger event by transferring a fallback command to the AI/ML server. At operation 606, the SMO and non-RT RIC communicate with the near-RT RIC in order to configure it and the CU/DU with a fallback configuration.

Figure 7:
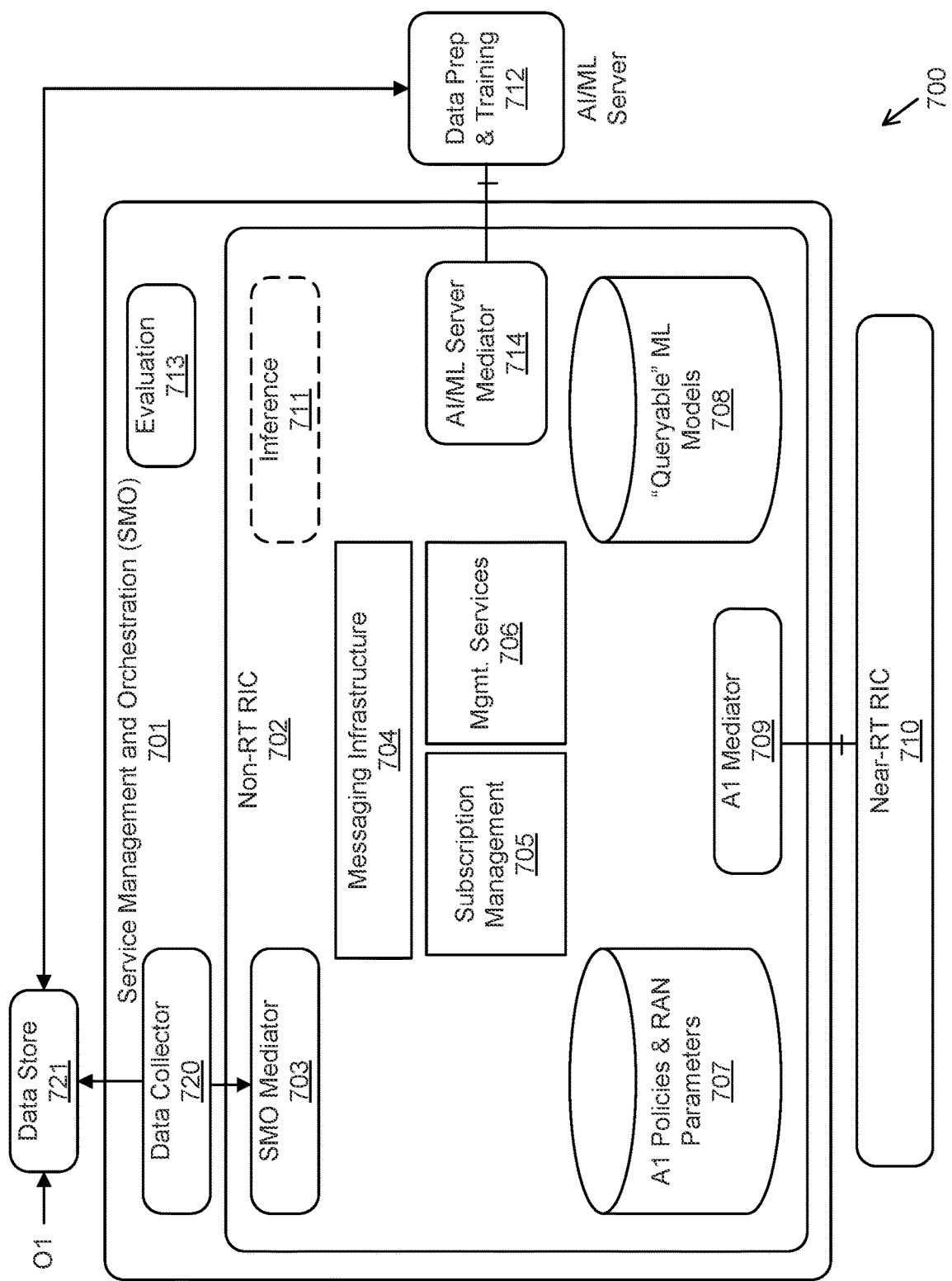
FIGS. 7 and 8 present two additional example options for the non-RT RIC functional split according to embodiments of the present disclosure.
Figure 8:
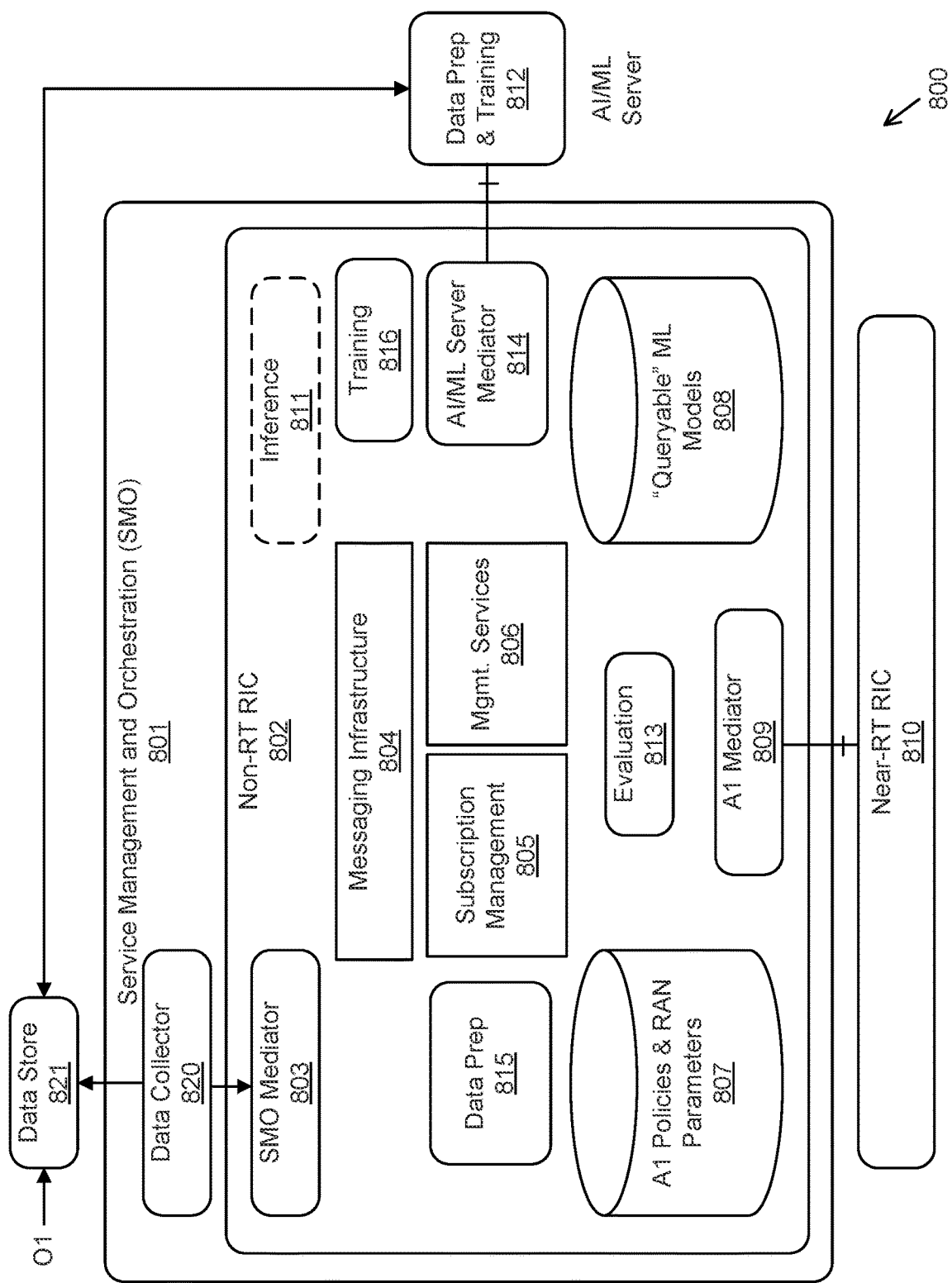

FIGS. 7 and 8 present two additional example options for the non-RT RIC functional split according to embodiments of the present disclosure. The figures and example options should not be interpreted as a limiting factor of the scope of this disclosure.

In the third embodiment, shown in FIG. 7, the architecture 700 includes an SMO 701 that includes the corresponding non-RT RIC 702, which in turn includes: an SMO mediator 703; messaging infrastructure 704; subscription management 705; management services 706; an A1 policies and RAN parameters datastore 707; datastore 708 of "queryable" ML models; and an A1 mediator 709 providing an interface to a corresponding near-RT RIC 710. The architecture 700 also includes an evaluation module 713 outside the non-RT RIC 702, a data collector 720 outside the non-RT RIC 702, and a data store 721 outside the SMO 701. The architecture 700 entails placing a data prep and/or training module as an external AI/ML server 712 outside the SMO 701, and an evaluation module outside the non-RT RIC 702. Again, defining the interface 714 between the non-RT RIC 702 and an external AI/ML server 712 is necessary, which will be discussed further below.

In the fourth embodiment, shown in FIG. 8, the architecture 800 includes an SMO 801 that includes the corresponding non-RT RIC 802, which in turn includes: an SMO mediator 803; messaging infrastructure 804; subscription management 805; management services 806; an A1 policies and RAN parameters datastore 807; datastore 808 of "queryable" ML models; and an A1 mediator 809 providing an interface to a corresponding near-RT RIC 810. The architecture 800 also includes a data collector 820 outside the non-RT RIC 802 and a data store 821 outside the SMO 801. The architecture 800 entails placing a data prep module 815 inside the non-RT RIC 802, a training module 816 inside the non-RT RIC 802, and an evaluation module 813 inside the non-RT RIC 802.

The external AI/ML server 712 (in the case of the third option) may possess the following capabilities in part or entirely to support a generic non-RT RIC 702 as exemplified in FIG. 7:
  Data preparation
    Including data selection, fusion, cleaning, etc.
  AI/ML modeling
    Including feature extraction, model selection, etc.
  AI/ML model training
  AI/ML model verification
  AI/ML model inference
    Includes running a trained model on test data to generate output including A1 policies, near-RT RIC parameter configurations, and RAN parameter configurations
  AI/ML model feedback
  AI/ML model training feedback for A1 policies
  AI/ML model training feedback for near-RT RIC parameters
  AI/ML model training feedback for RAN parameters
  Assisting non-RT RIC with AI/ML model maintenance
    Including metadata with AI/ML model feedback
    Including metadata with AI/ML model training feedback
The interface between the non-RT RIC and the AI/ML server may convey in part or entirely:
  pointers to SMO data from non-RT RIC to AI/ML server
    AI/ML server uses these pointers to retrieve SMO data from data store
  the following from AI/ML server to non-RT RIC:
    Trained AI/ML models
    Training results for A1 policies
    Training results for RAN/near-RT RIC parameters
In addition, the interface between the non-RT RIC and the AI/ML server may support the following functionalities as well as necessary information exchange:
  AI/ML lifecycle management in AI/ML server
    Includes the repeatable processes of data prep, training, and evaluation
    Monitoring and analytics may be handled in SMO
  Transfer of pointers to SMO data to AI/ML server to enable data prep
    AI/ML server uses these pointers to retrieve SMO data from data store
    Data prep is necessary for re-training of currently deployed ML model
  Transfer of trained ML model/metadata to non-RT RIC for addition to catalog of "queryable" ML models
    Metadata includes model ID, text description, training error, etc.
  Transfer of training results for generating/optimizing A1 policies to database of A1 policies Training results include training error, training dataset ID, timestamp, etc.

Transfer of training results for configuring RAN/near-RT RIC parameters to database of RAN/near-RT RIC parameters Training results include training error, training dataset ID, timestamp, etc.

Figure 9:
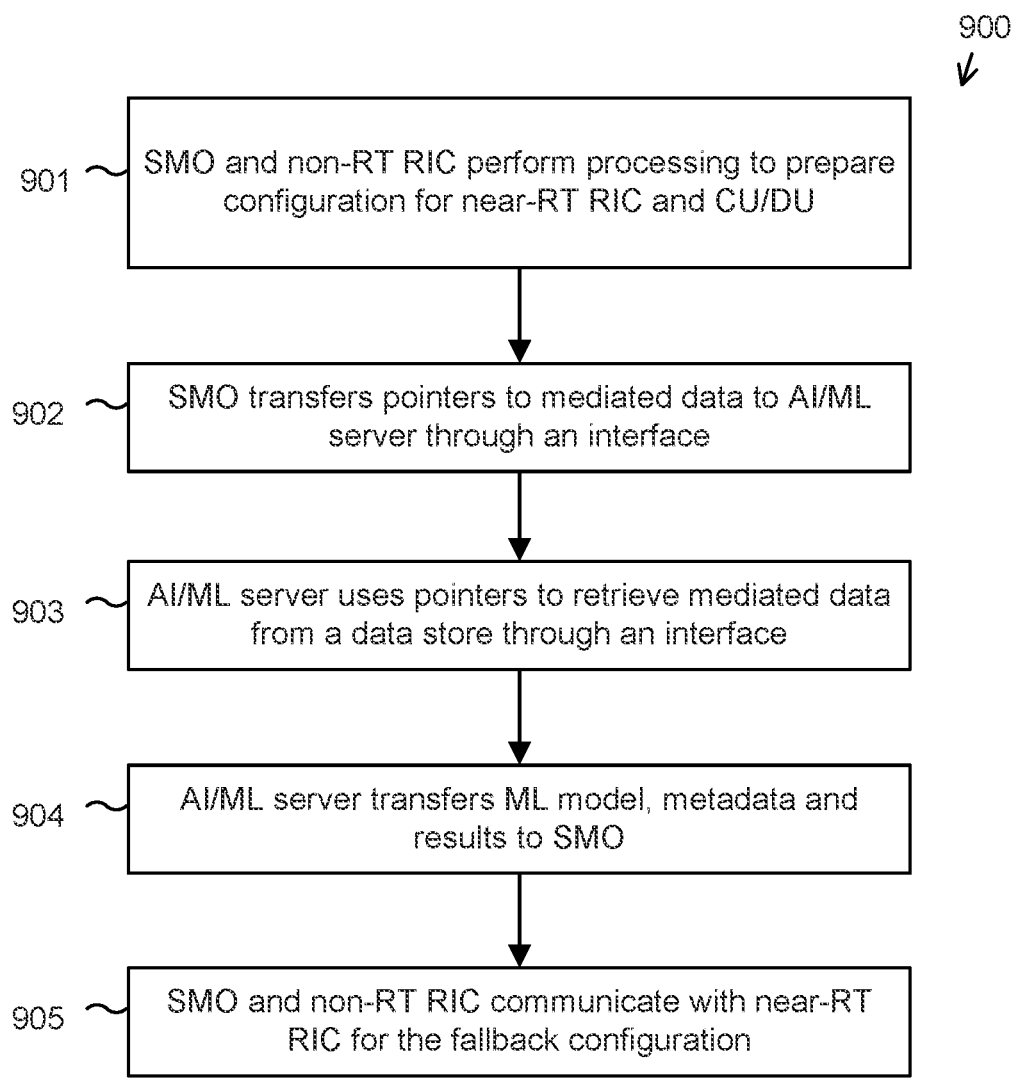
FIG. 9 is an example flow diagram of AI/ML-assisted configuration of near-RT RIC and CU/DU with the assistance of an AI/ML server according to embodiments of the present disclosure.

Transfer of "re-train" command to AI/ML server based on pre-configured trigger event FIG. 9 is an example flow diagram of AI/ML-assisted configuration of near-RT RIC and CU/DU with the assistance of an AI/ML server according to embodiments of the present disclosure. At operation 901 of method 900, the SMO and non-RT RIC process data from the RAN, including management information. At operation 902, the SMO transfers pointers to the processed data to an external AI/ML server through an interface. At operation 903, the AI/ML server uses the pointers to retrieve the processed data from a data store through an interface. The AI/ML server uses the processed data to train an ML model; the AI/ML server then transfers the trained ML model, metadata, and training results to the SMO through an interface, which is described at operation 904. At operation 905, the SMO and non-RT RIC use the trained ML model to communicate with the near-RT RIC in order to configure the near-RT RIC and the CU/DU.

Figure 10:
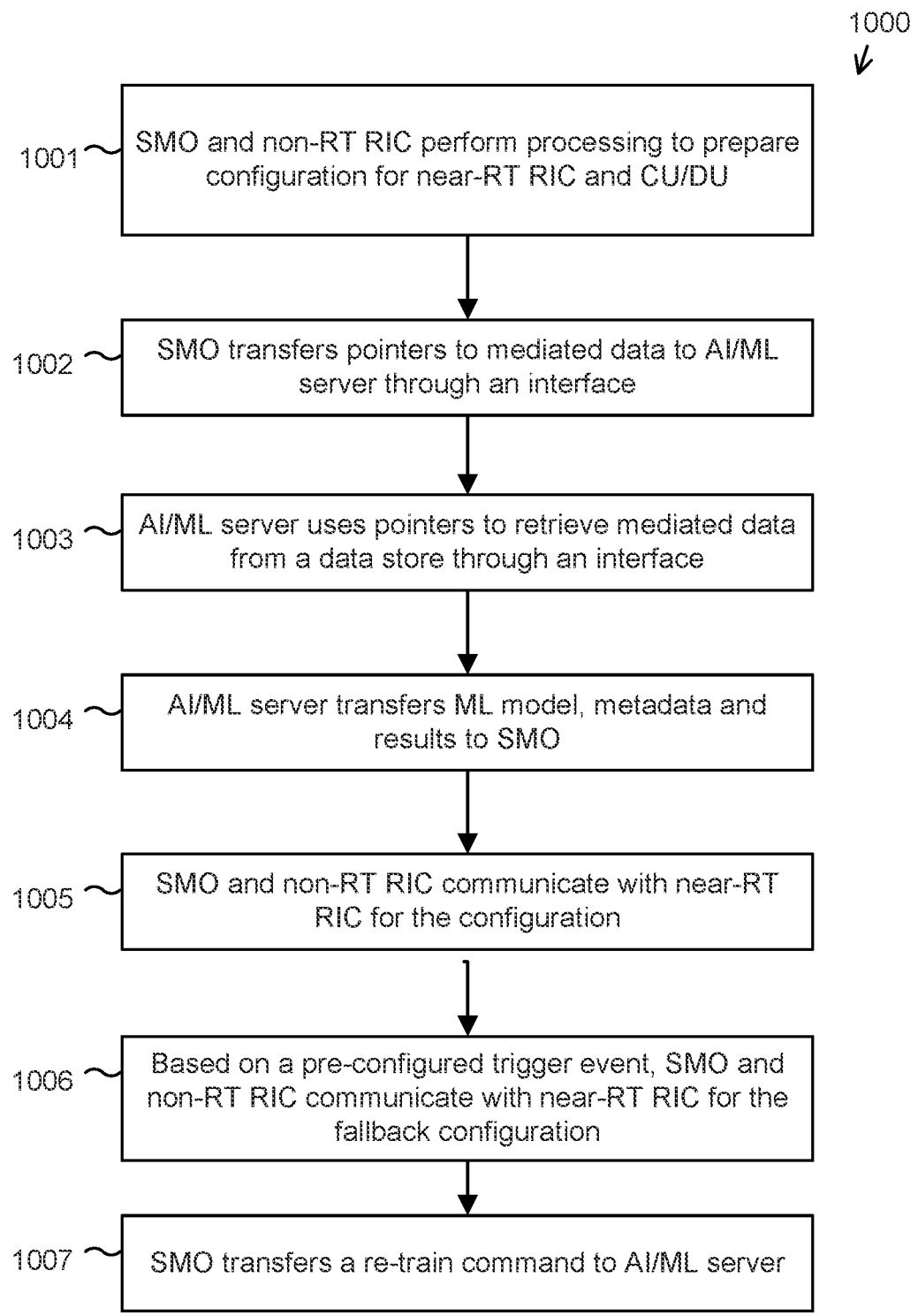
FIG. 10 is an example flow diagram of SMO-initiated fallback procedure for near-RT RIC and CU/DU for enabling the SMO to initiate a fallback procedure to a near-RT RIC and CU/DU according to embodiments of the present disclosure.

FIG. 10 is an example flow diagram of SMO-initiated fallback procedure for near-RT RIC and CU/DU for enabling the SMO to initiate a fallback procedure to a near-RT RIC and CU/DU according to embodiments of the present disclosure. At operation 1001 of method 1000, the SMO and non-RT RIC process data from the RAN, including management information. At operation 1002, the SMO transfers pointers to the processed data to an external AI/ML server through an interface. At operation 1003, the AI/ML server uses the pointers to retrieve the processed data from a data store through an interface. The AI/ML server uses the processed data to train an ML model; the AI/ML server then transfers the trained ML model, metadata, and training results to the SMO through an interface, which is described at operation 1004. At operation 1005, the SMO and non-RT RIC use the trained ML model to communicate with the near-RT RIC in order to configure the near-RT RIC and the CU/DU. At operation 1006, the SMO and non-RT RIC respond to a pre-configured trigger event by communicating with the near-RT RIC in order to configure the near-RT RIC and the CU/DU with a fallback configuration. At operation 1007, the SMO transfers a re-train command to the AI/ML server.

Figure 11:
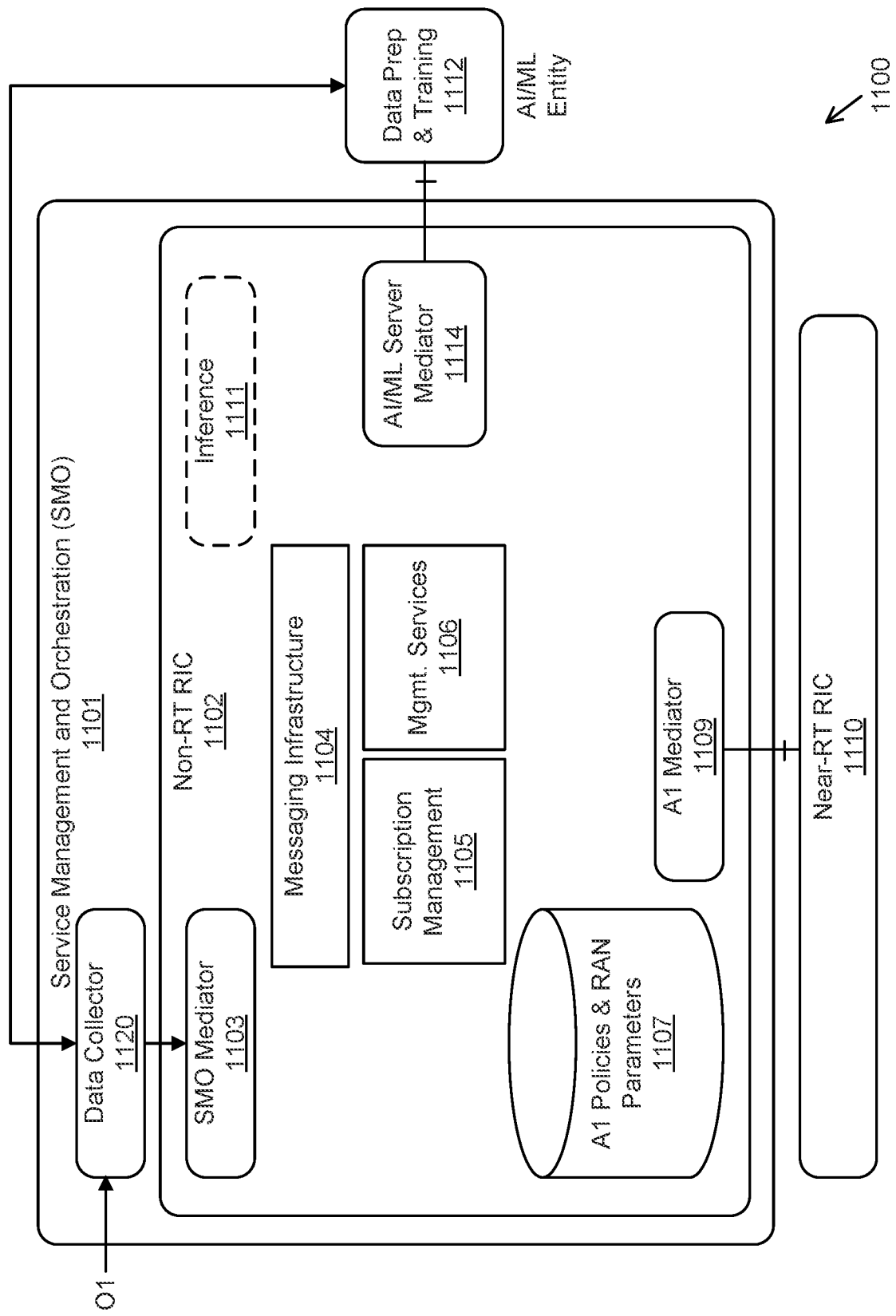
FIG. 11 presents an additional example option for the non-RT RIC functional split. The figures and example option should not be interpreted as a limiting factor of the scope of this disclosure.

FIG. 11 presents an additional example option for the non-RT RIC functional split. The figures and example option should not be interpreted as a limiting factor of the scope of this disclosure.

In the fifth embodiment, shown in FIG. 11, the architecture 1100 includes an SMO 1101 that includes the corresponding non-RT RIC 1102, which in turn includes: an SMO mediator 1103; messaging infrastructure 1104; subscription management 1105; management services 1106; an A1 policies and RAN parameters datastore 1107; and an A1 mediator 1109 providing an interface to a corresponding near-RT RIC 1110. The architecture 1100 also includes a data collector 1120 outside the non-RT RIC 1102. The architecture 1100 entails placing a data prep module and/or a training module (not shown) outside the SMO and an evaluation module (also not shown) outside the SMO.

An AI/ML entity (in the case of the fifth option) may possess the following capabilities in part or entirely to support a generic non-RT RIC as exemplified in FIG. 11:

Data preparation
  Including data selection, fusion, cleaning, etc.
Data storage
  Including storage of datasets for model training and model verification
AI/ML modeling
  Including feature extraction, model selection, etc.
AI/ML model training
AI/ML model verification
AI/ML model compilation
  Including conversion of file format of AI/ML model to a file format that is compatible with an AI/ML model inference host
AI/ML model optimization
  Including optimization of computational graph for AI/ML model to obtain improvements including a reduction in model size, an increase in model inference speed, etc.
AI/ML model inference
  Includes running a trained model on test data to generate output including A1 policies, near-RT RIC parameter configurations, and RAN parameter configurations
AI/ML model feedback
AI/ML model training feedback for A1 policies
AI/ML model training feedback for near-RT RIC parameters
AI/ML model training feedback for RAN parameters
Assisting non-RT RIC with AI/ML model maintenance
  Including metadata with AI/ML model feedback
  Including metadata with AI/ML model training feedback
AI/ML model catalog
Including storage of trained AI/ML models with metadata The interface between the non-RT RIC and the AI/ML entity may convey in part or in entirety of:
  pointers to SMO data from non-RT RIC to AI/ML entity
    AI/ML entity uses these pointers to retrieve SMO data from internal data store
  the following from AI/ML entity to non-RT RIC:
    Trained AI/ML models
    Training results for A1 policies
    Training results for RAN/near-RT RIC parameters In addition, the interface between the non-RT RIC and the AI/ML entity may support the following functionalities as well as necessary information exchange:
  AI/ML lifecycle management in AI/ML entity
    Includes the repeatable processes of data prep, training, and evaluation
    Monitoring and analytics may be handled in SMO
  Transfer of pointers to SMO data to AI/ML entity to enable data prep
    AI/ML entity uses these pointers to retrieve SMO data from internal data store
    Data prep is necessary for re-training of currently deployed ML model
  Transfer of trained ML model/metadata to non-RT RIC for addition to catalog of "queryable" ML models
    Metadata includes model ID, text description, training error, etc.
  Transfer of training results for generating/optimizing A1 policies to database of A1 policies
    Training results include training error, training dataset ID, timestamp, etc.

Transfer of training results for configuring RAN/near-RT RIC parameters to database of RAN/near-RT RIC parameters Training results include training error, training dataset ID, timestamp, etc.

Figure 12:
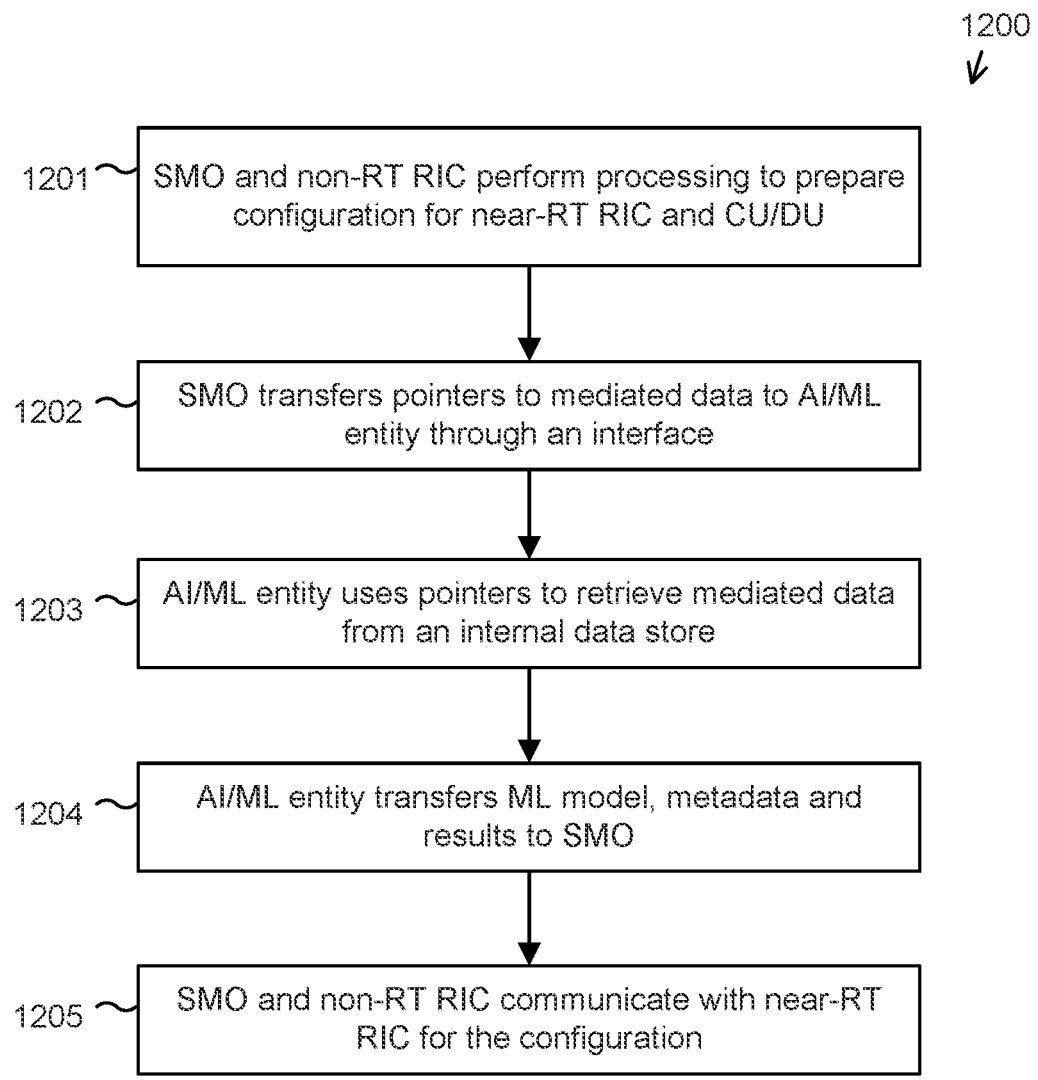
FIG. 12 is an example of a flow diagram of AI/ML-assisted configuration of near-RT RIC and CU/DU with the assistance of an AI/ML entity according to embodiments of the present disclosure.

Transfer of "re-train" command to AI/ML entity based on pre-configured trigger event FIG. 12 is an example of a flow diagram of AI/ML-assisted configuration of near-RT RIC and CU/DU with the assistance of an AI/ML entity according to embodiments of the present disclosure. At operation 1201 of method 1200, the SMO and non-RT RIC process data from the RAN, including management information. At operation 1202, the SMO transfers pointers to the processed data to an AI/ML entity through an interface. At operation 1203, the AI/ML entity uses the pointers to retrieve the processed data from an internal data store. The AI/ML entity uses the processed data to train an ML model; the AI/ML entity then transfers the trained ML model, metadata, and training results to the SMO through an interface, which is described at operation 1204. At operation 1205, the SMO and non-RT RIC use the trained ML model to communicate with the near-RT RIC in order to configure the near-RT RIC and the CU/DU.

Figure 13:
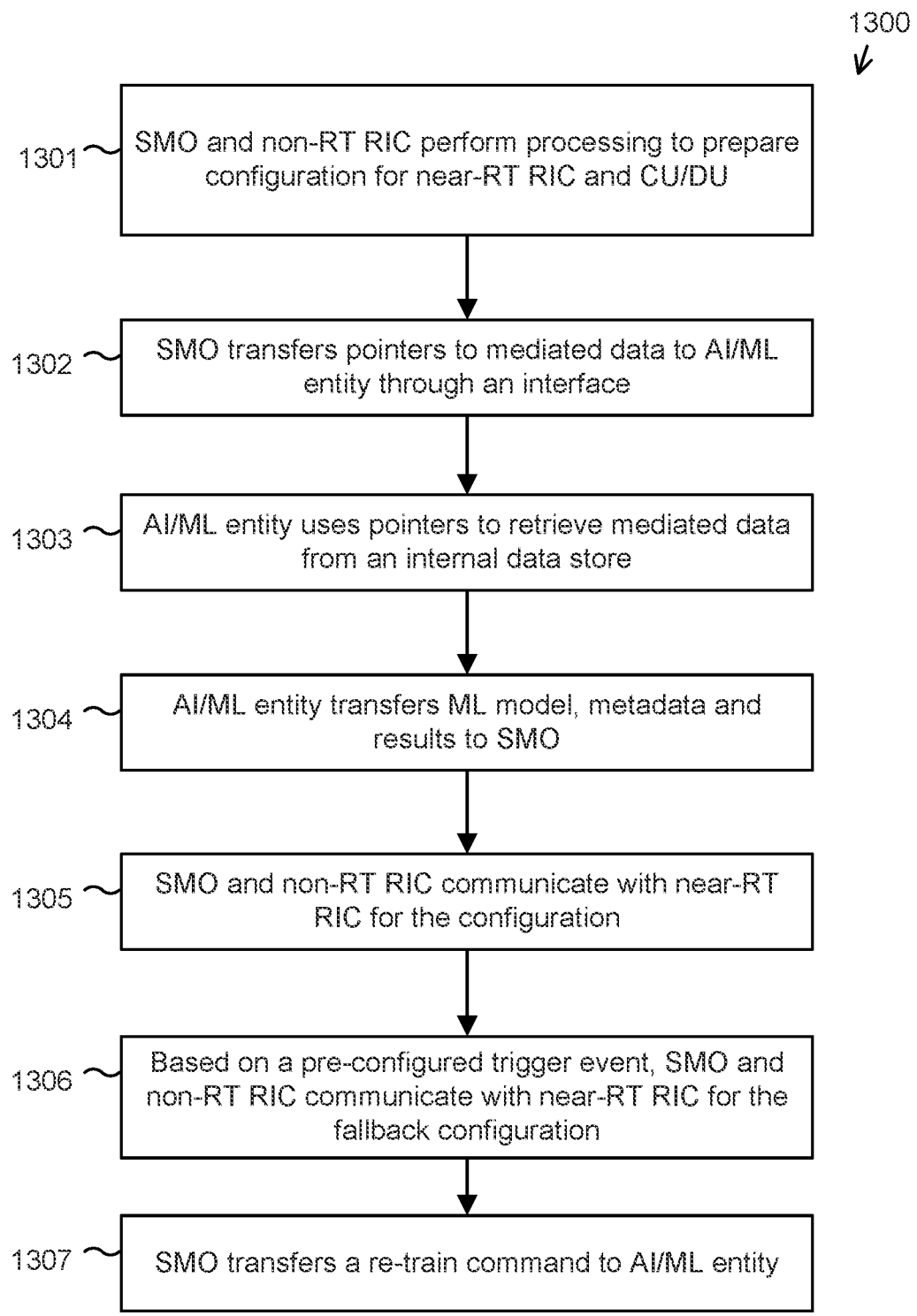
FIG. 13 is an example flow diagram of AI/ML-assisted configuration of near-RT RIC and CU/DU for enabling the SMO to initiate a fallback procedure to a near-RT RIC and CU/DU according to embodiments of the present disclosure.

FIG. 13 is an example flow diagram of AI/ML-assisted configuration of near-RT RIC and CU/DU for enabling the SMO to initiate a fallback procedure to a near-RT RIC and CU/DU according to embodiments of the present disclosure. At operation 1301 of method 1300, the SMO and non-RT RIC process data from the RAN, including management information. At operation 1302, the SMO transfers pointers to the processed data to an AI/ML entity through an interface. At operation 1303, the AI/ML entity uses the pointers to retrieve the processed data from an internal data store. The AI/ML entity uses the processed data to train an ML model; the AI/ML entity then transfers the trained ML model, metadata, and training results to the SMO through an interface, which is described at operation 1304. At operation 1305, the SMO and non-RT RIC use the trained ML model to communicate with the near-RT RIC in order to configure the near-RT RIC and the CU/DU. At operation 1306, the SMO and non-RT RIC respond to a pre-configured trigger event by communicating with the near-RT RIC in order to configure the near-RT RIC and the CU/DU with a fallback configuration. At operation 1307, the SMO transfers a re-train command to the AI/ML entity.

A need exists to determine how the functional architecture of the non-RT RIC can support enrichment information (EI), which can be used to enhance the operation of the RAN. Several non-RT RIC functional blocks that could support EI are disclosed as well as the functionality of an external EI source. Furthermore, details on the interface between the non-RT RIC and an external EI source are disclosed including information elements to be exchanged over the interface.

Figure 14:
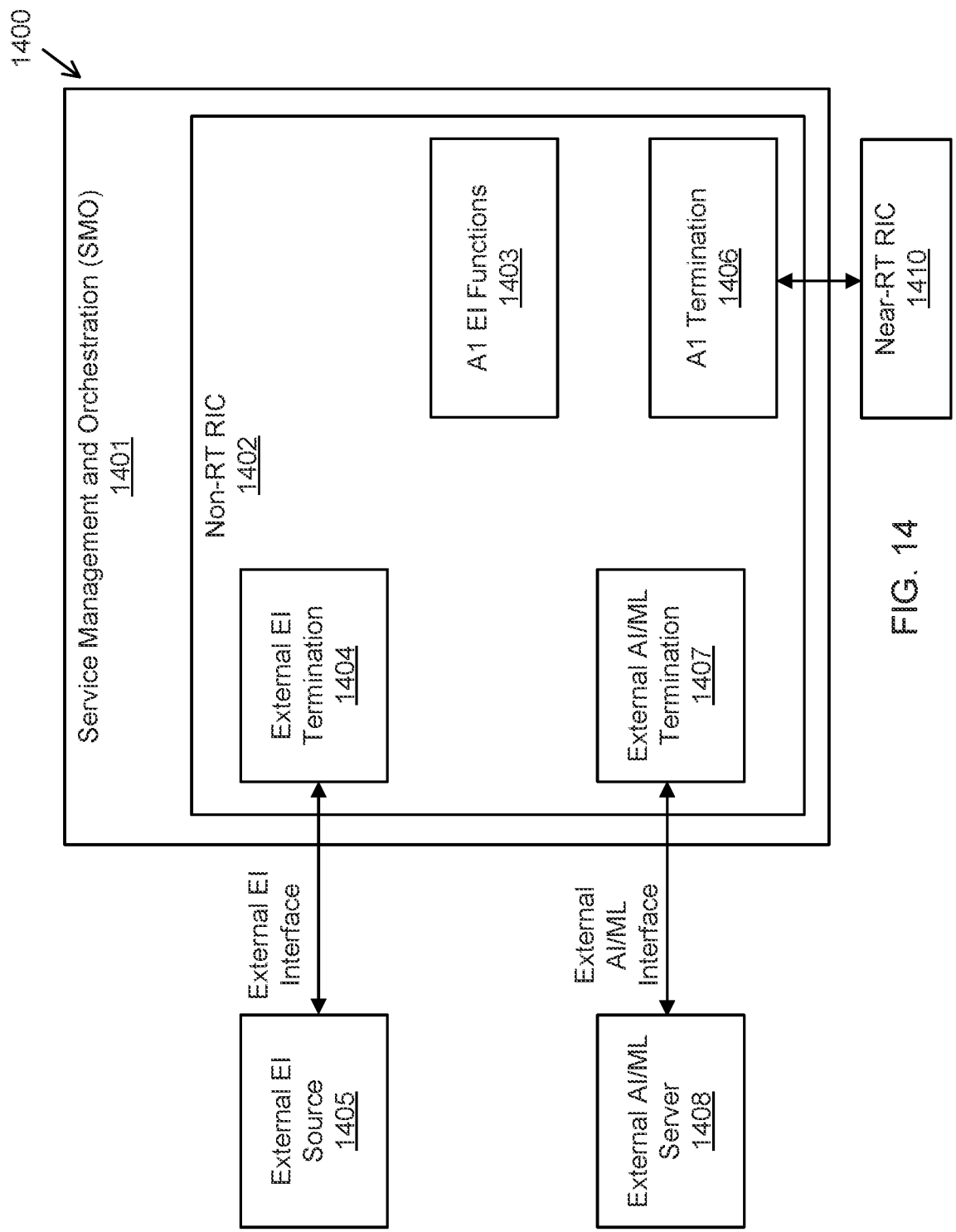
FIG. 14 depicts non-RT RIC functional architecture support of EI according to embodiments of the present disclosure.

FIG. 14 depicts non-RT RIC functional architecture support of EI according to embodiments of the present disclosure. Several non-RT RIC functional blocks are presented that could support EI. The figures should not be interpreted as a limiting factor of the scope of this disclosure.

The architecture 1400 includes an SMO 1401 that includes the non-RT RIC 1402. The non-RT RIC functional blocks that could support EI are the A1 EI functions 1403, the external EI termination 1404 and the associated external EI interface to an external EI source 1405. The architecture 1400 further includes the A1 termination 1406 interfacing with the near-RT RIC 1410. The non-RT RIC 1402 includes external AI/ML termination 1407 and the associated external AI/ML interface to an external AI/ML server 1408. Defining the interface between the non-RT RIC 1402 and an external EI source 1405 is necessary, which will be further discussed.

The following capabilities that the aforementioned non-RT RIC functional blocks may possess in part or entirety to support EI as exemplified in FIG. 14:

A1 EI database
  Including EI IDs
  Including current values of EI
    For example, the (latitude, longitude, altitude) of a UE could be EI for the vehicle-to-everything (V2X) handover management use case
  Including target KPIs
    For example, the number of ping-pong handovers could be a target key performance indicator (KPI) for the V2X handover management use case
  Including current and prior values of target KPIs
    For example, the number of ping-pong handovers could decrease after utilizing EI for the V2X handover management use case
  Including requesting rApps (software application(s) hosted by the non-RT RIC—that is, the non-RT RIC is a platform for rApps, including rApps developed by different vendors)
  Including requesting xApps (software application(s) hosted by the near-RT RIC)
A1 EI data sharing component
  Including processing of EI subscription requests from rApps
    For example, an rApp could be deployed in the non-RT RIC to address the V2X handover management use case; this rApp could subscribe to EI from a V2X application server
  Including processing of EI subscription requests from xApps
  Including routing of EI to requesting rApps
    For example, Cooperative Awareness Messages (CAM) from a V2X application server could be routed to an rApp that requests CAM
  Including routing of EI to requesting xApps
External EI termination
  Including securing of external EI interface
  Including decoding of incoming messages from external sources of EI
    For example, a V2X application server could send ASN.1 encoded messages to the non-RT RIC
  Including routing of handshaking messages from non-RT RIC to external sources of EI
  Including converting external data models
  For example, a V2X application server could send 5GAA (5G Automotive Association) standard-compliant messages that could be converted into an appropriate format for SMO/non-RT RIC internal messaging The interface between the non-RT RIC 1402 and an external source 1405 of EI may convey in part or the entirety of:

EI request messages
  For example, an rApp that has been deployed in the non-RT RIC to address the UAV dynamic resource allocation use case could request flight path information of a UAV; the non-RT RIC could convey that request to a UTM application server
EI response messages
  For example, a UTM application server could convey flight path information of a UAV to the non-RT RIC; the non-RT RIC could convey that information to an rApp that has requested it In addition, the interface between the non-RT RIC 1402 and an external source 1405 of EI may support the following functionalities as well as necessary information exchange:

Support registration of an external source of EI

Support transmission of external EI from its source to an rApp that requests it

Support transmission of external EI from its source to an xApp that requests it

Support transmission of handshaking messages from non-RT RIC to an external source of EI An rApp can also create EI in addition to requesting EI. For example, an rApp can use RAN measurement data to generate radio fingerprints. As another example, an rApp can use video application data to generate statistics such as the average bit-rate and the bit-rate for each segment.

Figure 15:
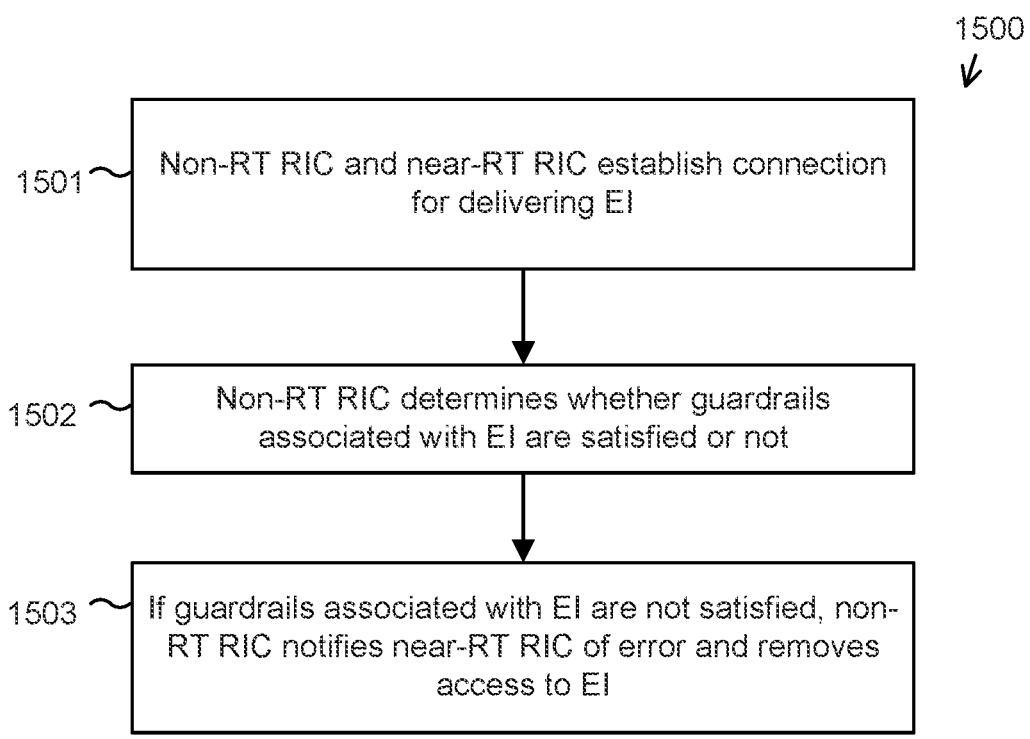
FIG. 15 is an example flow diagram of non-RT RIC error handling for EI according to embodiments of the present disclosure.

FIG. 15 is an example flow diagram of non-RT RIC error handling for EI according to embodiments of the present disclosure. The method 1500 is for the non-RT RIC to handle errors in EI. At operation 1501, the non-RT RIC establishes a connection with the near-RT RIC to deliver EI to the near-RT RIC. At operation 1502, the non-RT RIC determines whether the guardrails associated with the EI are satisfied or not.

Any piece of EI should satisfy the associated guardrails; if a piece of EI does not satisfy its associated guardrails, then the non-RT RIC determines that an error has occurred. For example, if a radio fingerprint maps to a UE that is unknown from the perspective of the non-RT RIC, then that radio fingerprint has not satisfied associated guardrails. As another example, assume that a V2X application server has sent the position of a UE to the non-RT RIC; if that position corresponds to a location outside of the network operator's domain, then that position has not satisfied associated guardrails.

If the guardrails associated with the EI are not satisfied, then the non-RT RIC notifies the near-RT RIC that an error has occurred and removes access to the EI at operation 1503.

Figure 16:
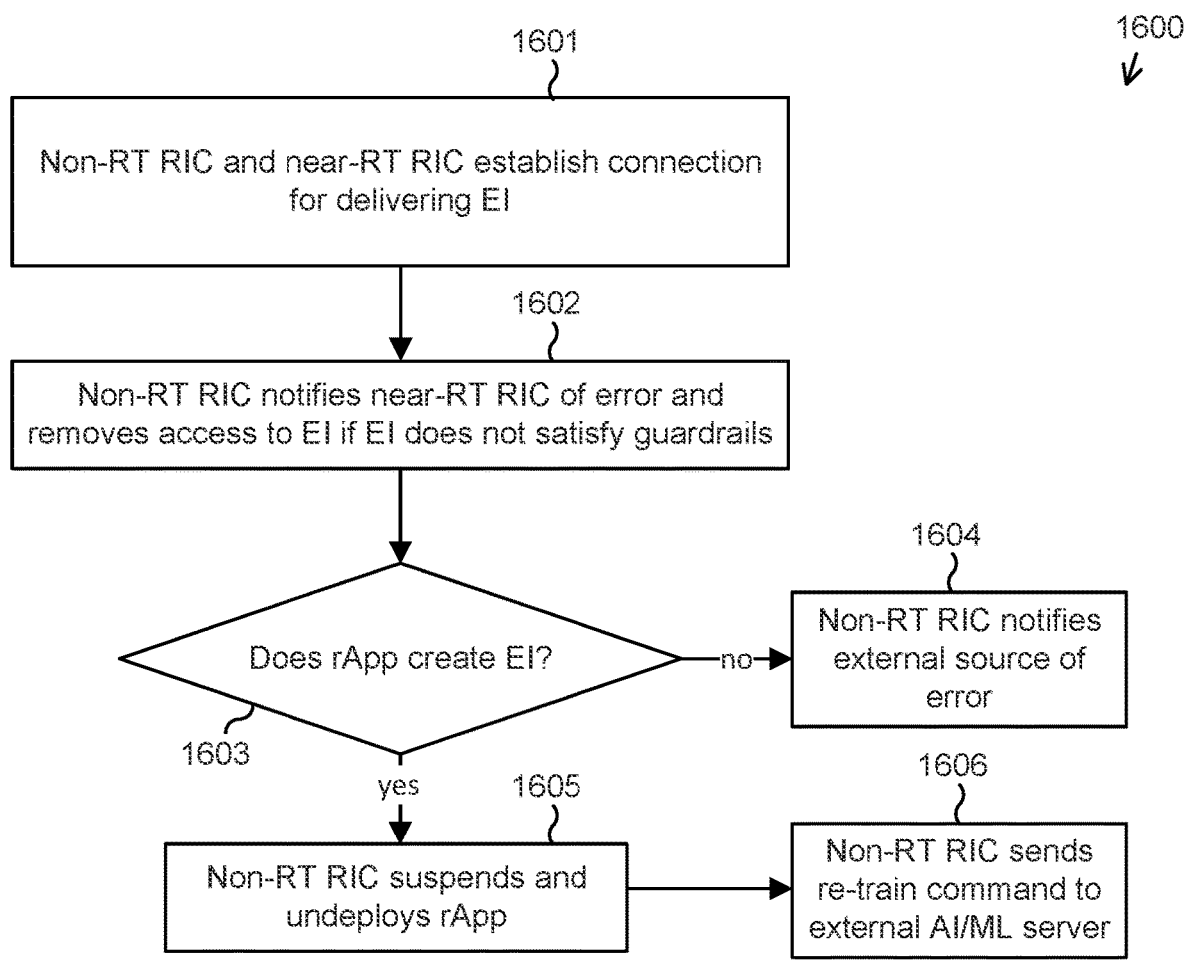
FIG. 16 is an example flow diagram of non-RT RIC error handling when EI does not satisfy associated guardrails according to embodiments of the present disclosure.

FIG. 16 is an example flow diagram of non-RT RIC error handling when EI does not satisfy associated guardrails according to embodiments of the present disclosure. The method 1600 is for the non-RT RIC to handle errors in EI when the EI does not satisfy its own guardrails. At operation 1601, the non-RT RIC establishes a connection with the near-RT RIC to deliver EI to the near-RT RIC. At operation 1602, the non-RT RIC checks if the EI that is about to be delivered satisfies associated guardrails; if not, then the non-RT RIC notifies the near-RT RIC that an error has occurred and removes access to the EI. The non-RT RIC then checks if an rApp created the EI at operation 1603. If an rApp did not create the EI, then the EI was created by an external source, and so the non-RT RIC notifies that external source at operation 1604. If an rApp did create the EI, then the non-RT RIC suspends and un-deploys the rApp at operation 1605. The non-RT RIC sends a re-train command for the rApp to an external AI/ML server at operation 1606.

Figure 17:
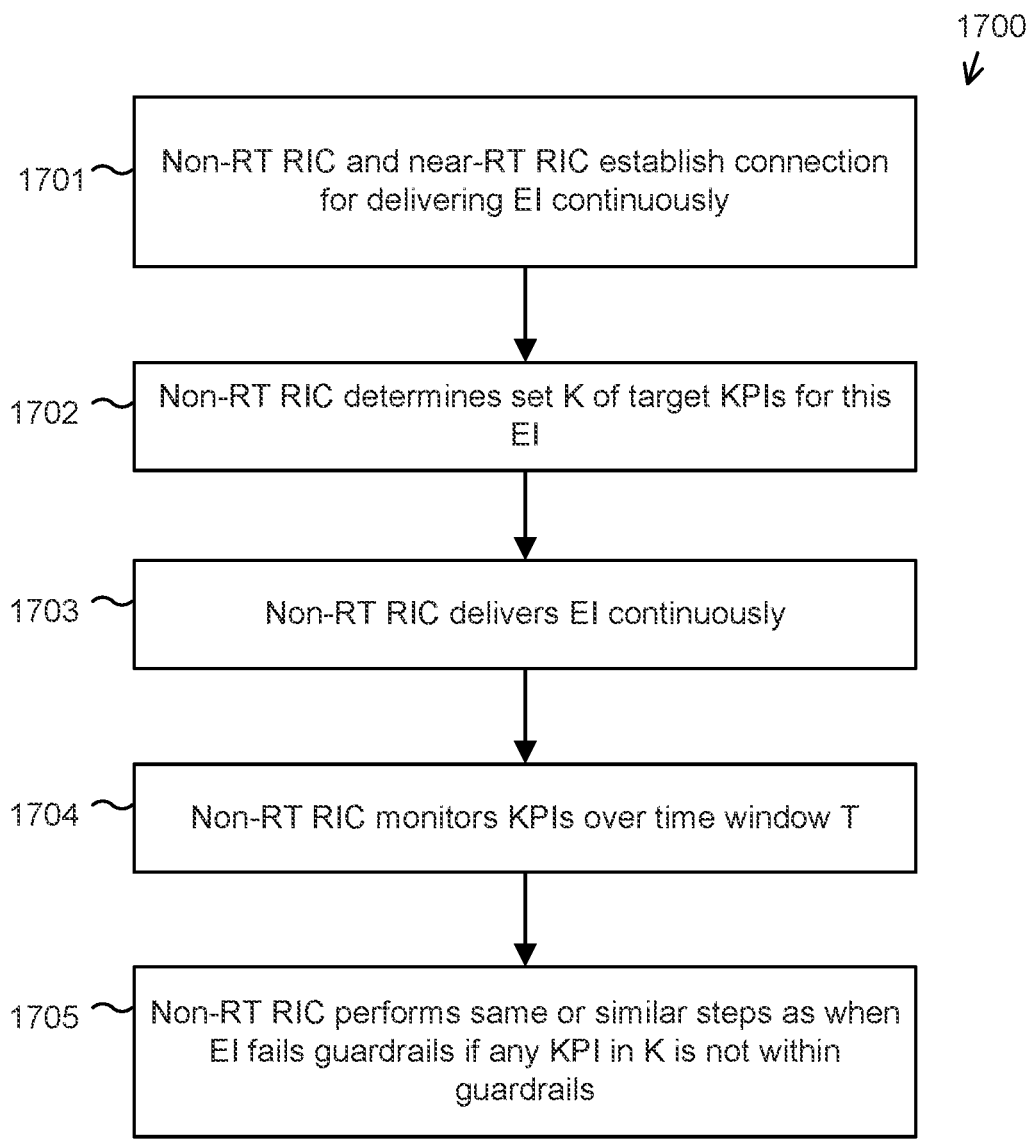
FIG. 17 is an example flow diagram of non-RT RIC error handling for continuous delivery of EI when target KPIs do not satisfy their guardrails according to embodiments of the present disclosure.

FIG. 17 is an example flow diagram of non-RT RIC error handling for continuous delivery of EI when target KPIs do not satisfy their guardrails according to embodiments of the present disclosure. The method 1700 is for the non-RT RIC to handle errors in continuous delivery of EI when the target KPIs for the EI do not satisfy their own guardrails. At operation 1701, the non-RT RIC establishes a connection with the near-RT RIC to continuously deliver EI to the near-RT RIC. At operation 1702, the non-RT RIC determines the set K of target KPIs for the EI. At operation 1703, the non-RT RIC continuously delivers EI. At operation 1704, the non-RT RIC monitors all KPIs over a time window T. At operation 1705, the non-RT RIC checks if the KPIs in K satisfy their guardrails; if not, then the non-RT RIC performs the same or similar steps as operation 1603 in FIG. 16, where EI does not satisfy its guardrails.

Beam management is defined as a set of Layer 1 (i.e., physical layer)/Layer 2 (i.e., medium access control) procedures to acquire and maintain a set of beam pair links i.e., a beam used at transmit-receive point(s) (TRP(s)) for BS side paired with a beam used at UE. The beam pair links can be used for downlink (DL) and uplink (UL) transmission/reception.

The beam management procedures include at least the following six aspects:

Beam sweeping: operation of covering a spatial area, with beams transmitted and/or received during a time interval in a predetermined way.

Beam measurement: for TRP(s) or UE to measure characteristics of received beamformed (BF) signals Beam reporting: for UE to report information of BF signal(s) based on beam measurement Beam determination: for TRP(s) or UE to select of its own Tx/Rx beam(s).

Beam maintenance: for TRP(s) or UE to maintain the candidate beams by beam tracking or refinement to adapt to the channel changes due to UE movement or blockage.

Beam recovery: for UE to identify new candidate beam(s) after detecting beam failure and subsequently inform TRP of beam recovery request with information of indicating the new candidate beam(s)

For beam management, the motivation for beyond 5G is to extend broader use cases and scenarios, e.g., ultra-reliable & low latency communication (URLLC), millimeter wavelength (mmWave) multi-user, multiple input, multiple output (MU-MIMO) enhancement, and UE power saving, etc. In order to support these use cases, technical improvements for 5G beam management become indispensable.

Figure 18:
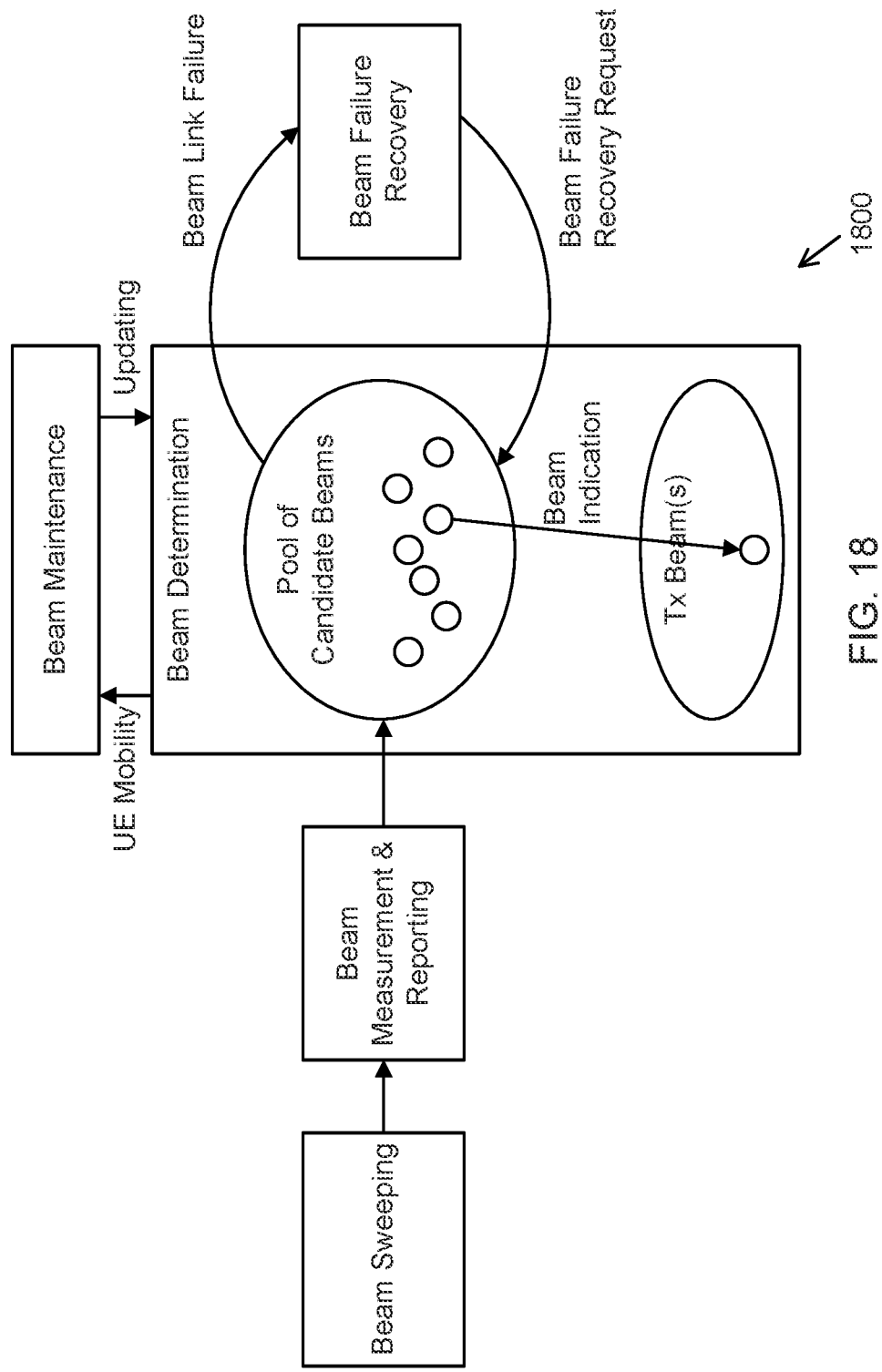
FIG. 18 illustrates different procedures involved in beam management.

Application of AI algorithms, including machine learning (ML), in beam management for communication networks has drawn a lot of interest in recent research. AI algorithms are described as being used for deployment of 5G networks, and AI applications are expected to be more widely used in the network or even UE implementation. In general, AI is a tool to help network to make a quicker and wiser decision(s) based on training data in the past. The potential benefits of standardization support are feedback/control signaling overhead reduction, more accurate feedback, and enabling better AI algorithms, which require coordination between base station and UE. These potential benefits will then translate to better system performance, e.g., in terms of throughput and reliability. AI can be applied in the following two beam management aspects Beam forming Beam tracking Defining the requirements for AI based beam management fall under the purview of the use case requirements of the use case of quality of service (QoS) optimization. The different procedures involved in beam management are depicted in FIG. 18 and include beam determination, which receives updates from beam maintenance and provides UE mobility information to beam maintenance and which also signals beam link failure and receives beam failure recovery requests. Beam sweeping feeds information to beam measurement and reporting, which provides information to beam determination for use in selecting a transmission (Tx) beam from among a pool of candidate beams using a beam indication.

Figure 19:
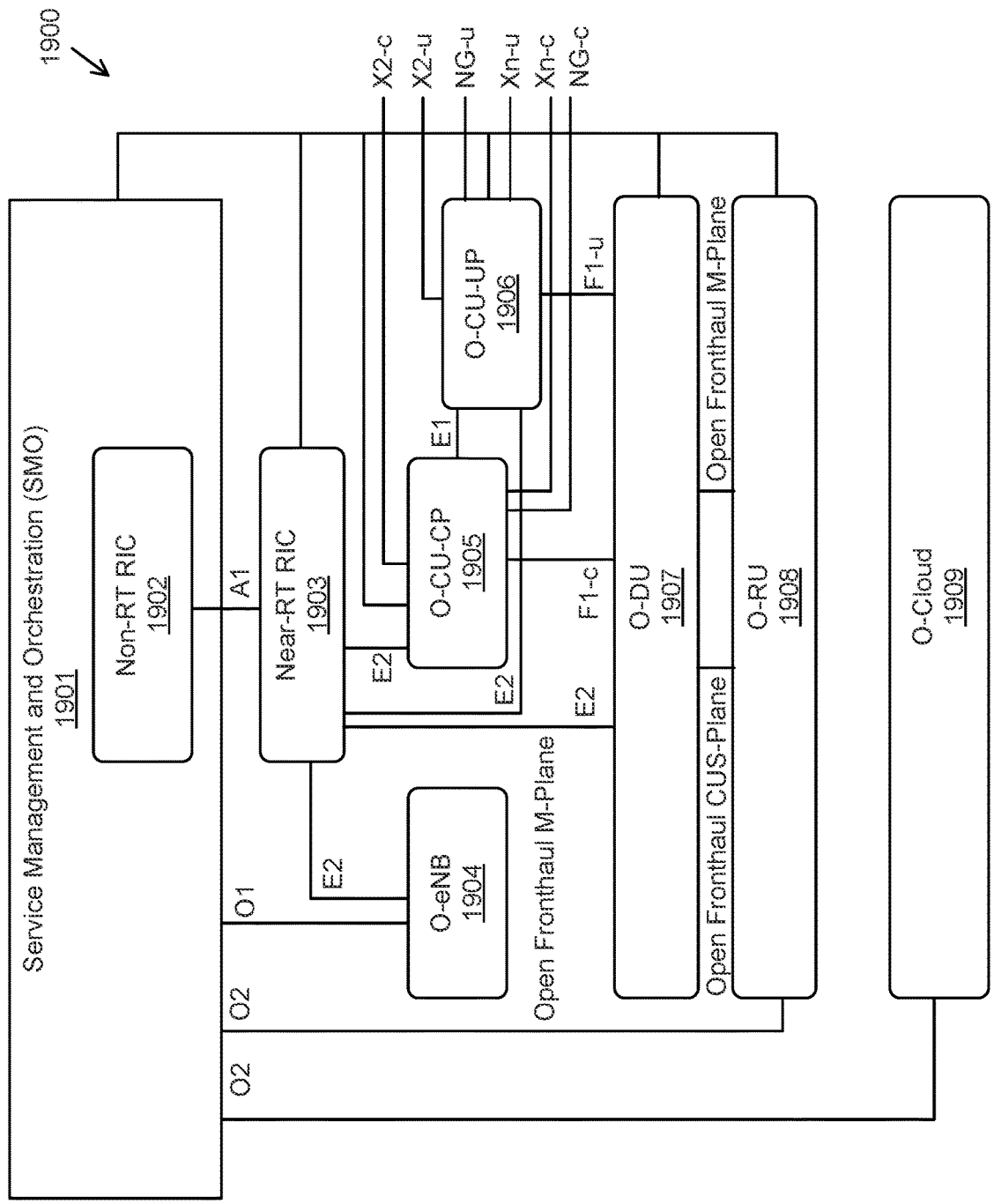
FIG. 19 illustrates the framework of an architecture that could support AI/ML assisted beam management with additional E2 functionality enhancements according to embodiments of the present disclosure.

FIG. 19 illustrates the entity of an architecture that could support AI/ML assisted beam management with additional E2 functionality enhancements according to embodiments of the present disclosure.

Different entities involved are as follows:

1. SMO entity 1901: Collect necessary measurement metrics from network level measurement report and enrichment data (may acquire data from application) for constructing/training relevant AI/ML models
2. Non-RT RIC 1902: Send A1 policies to Near-RT RIC to drive resource optimization at RAN level.
3. Near-RT RIC 1903:
   Support inference, such as QoS prediction, using AI/ML models from non-RT RIC based on network data, e.g., measurement reports from E2 Node.
   Support interpretation and execution of A1 policies from non-RT RIC.
   Sending QoS resource optimization related policies and commands to E2 Node to influence RRM behavior.
4. E2 Node (e.g., O-eNB 1904, O-CU-CP 1905, O-CU-UP 1906, and O-DU 1907, combined):
   Support reporting of UE context, network measurements, and UE measurements to Near-RT RIC over E2 interface.
   Executes policies and commands received from Near-RT RIC over E2 interface
   Support network and UE performance report to the SMO entity over O1 interface.
   Provides a service known as RIC Service to provide access to messages and measurements and/or enable control of the E2 Node from the Near-RT RIC. Such as REPORT, INSERT, CONTROL and POLICY The CU control plane (CP) 1905, CU user plane (UP) 1906, DU 1907, radio unit (RU) 1908 and cloud 1909 are also depicted.

Figure 20:
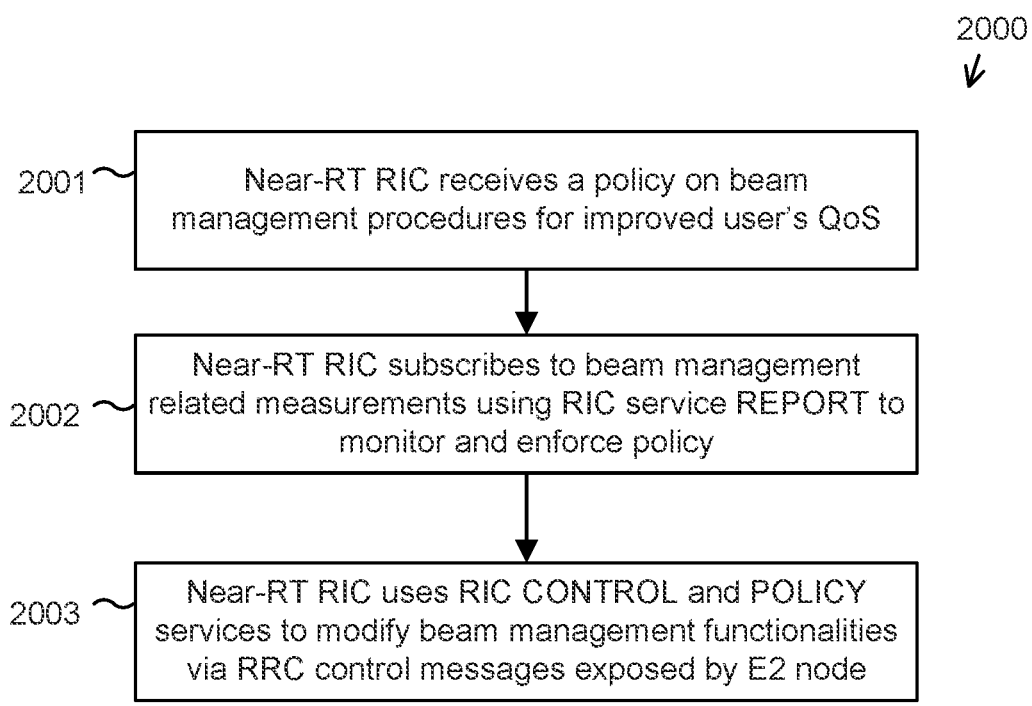
FIG. 20 illustrates an example flow diagram of near-RT RIC implementing policies for efficient beam management according to embodiments of the present disclosure.

FIG. 20 illustrates an example flow diagram of near-RT RIC implementing policies for efficient beam management according to embodiments of the present disclosure. The method 2000 is for near-RT RIC to effectively alter RAN behavior to achieve efficient beam management procedures. At operation 2001, the near-RT RIC receives a policy from the non-RT RIC over A1 interface or from the SMO entity over O1 interface. The policy is targeted at achieving optimal beam management procedures that includes but are not limited to beam tracking, beam failure recovery.

At operation 2002, the near-RT RIC uses the RIC service REPORT to subscribe to beam management related measurements exposed by E2 nodes that include but are not limited to:

1) Beam level RSRP, RSRQ, SINR (TS 36.331, TS 38.331), including from periodical and/or event triggered measurement report (A1-A6, B1-B2) of serving cell available at CU-CP
2) Beam level RSRP, RSRQ, SINR (TS 36.331, TS 38.331), including from periodical and/or event triggered measurement report (A1-A6, B1-B2) of neighboring cells available at CU-CP
3) Serving beam indicator The near-RT RIC monitors the measurement values, and decides to intervene to update/modify RAN behavior as deemed necessary by the policy.

Figure 21:
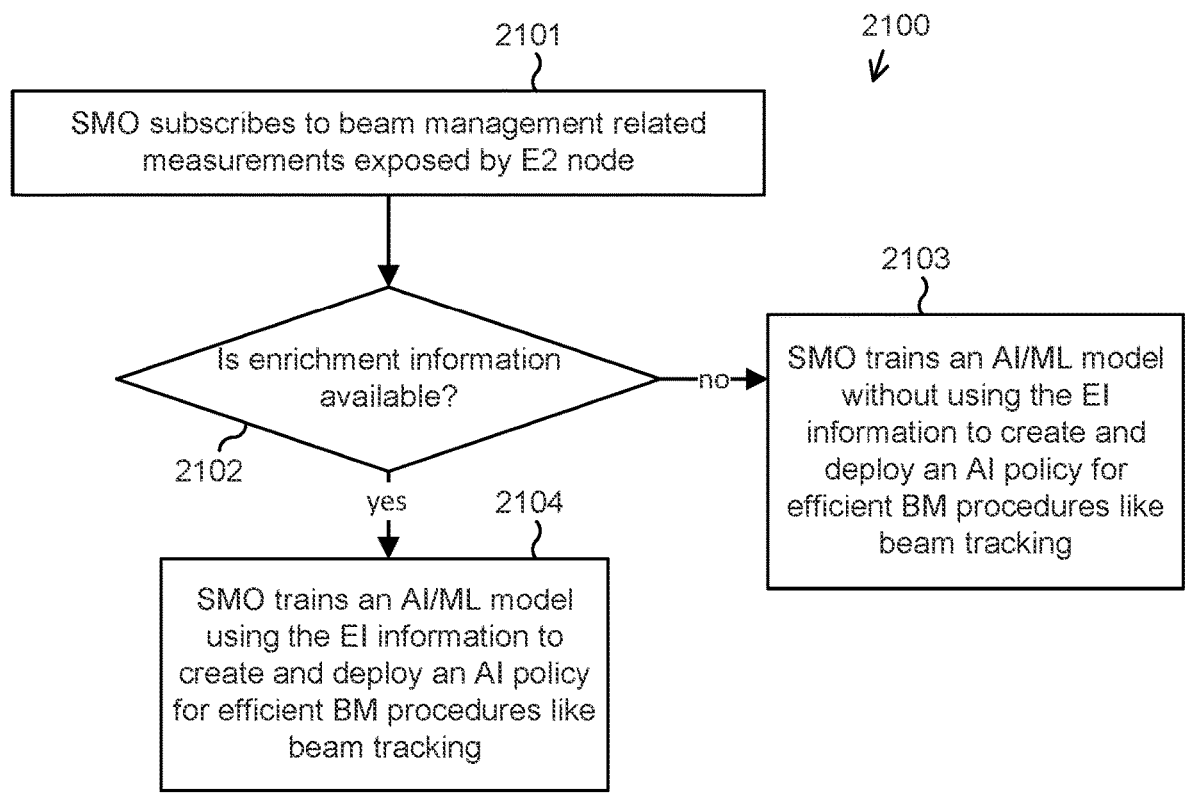
FIG. 21 illustrates an example flow diagram of SMO training AI/ML model for beam management according to embodiments of the present disclosure.

At operation 2003, the near-RT RIC uses RIC services CONTROL and POLICY to modify beam management related procedures that include but are not limited to beam tracking, beam failure recovery, beam reporting. This is achieved by updating the remote radio control (RRC) control information elements (IEs) exposed by the E2 node that include but are not limited to:

1) CSI-MeasConfig (TS 38.331): Candidate beam sets are configured/updated
   The IE CSI-MeasConfig is used to configure CSI-RS (reference signals) belonging to the serving cell in which CSI-MeasConfig is included, channel state information reports to be transmitted on PUCCH on the serving cell in which CSI-MeasConfig is included and channel state information reports on PUSCH triggered by DCI received on the serving cell in which CSI-MeasConfig is included.
   csi-ReportConfigToAddModList
   csi-ResourceConfigToAddModList
   csi-SSB-ResourceSetToAddModList
2) CSI-Report Config (TS 38.331): The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included
   reportQuantity—cri-RSRP or ssb-Index-RSRP
   nrofReportedRS
3) CSI-ResourceConfig (TS 38.331): The IE CSI-ResourceConfig defines a group of one or more NZP-CSI-RS-ResourceSet, CSI-IM-ResourceSet and/or CSI-SSB-ResourceSet.
   Resource—NZP CSI-RS, or SSB, or CSI-IM
4) BeamFailureRecoveryConfig (TS 38.331): The IE BeamFailureRecoveryConfig is used to configure the UE with RACH resources and candidate beams for beam failure recovery in case of beam failure detection
   Rsrp-TresholdSSB
   Rsrp-ThresholdCSI_RS
   CandidateBeamRSList FIG. 21 illustrates an example flow diagram of SMO training AI/ML model for beam management according to embodiments of the present disclosure. The method 2100 is for an SMO entity to perform data collection and train an AI/ML model for efficient beam management. At operation 2101, the SMO entity subscribes to beam management related measurements that include but not limited to the ones mentioned before. The non RT-RIC can access enrichment information (EI) from an external EI source by an external EI interface. The non-RT RIC functional blocks that could support EI are the A1 EI functions, the external EI termination, and the external EI interface. At operation 2102, the SMO entity checks for available enrichment information that include but are not limited to user's position, velocity.

At operation 2103 and 2104, the SMO entity trains an AI/ML model based on the information available. Various neural networks such as reinforcement learning can be used. The goal of the ML model is to improve the beam management procedure, i.e., make beam management efficient by reducing latency required, increase connection to idle beams, always connect to best beam, reduce frequency of beam failures so that the UE always meets the specified QoS metric (such as throughput) requirements.

Some of possible methods can involve predicting the UE motion to set a list of candidate beams for the UE which reduces the latency involved with beam tracking procedure. Another method could be for the case of beam failure, where the candidate beam set to consider can also be predicted using ML model to speed up the recovery procedure.

Although this disclosure has been described with an exemplary embodiment, various changes and modifications may be suggested to one skilled in the art. It is intended that this disclosure encompass such changes and modifications as fall within the scope of the appended claims.

What is claimed is:

1. A method at a service management and orchestration (SMO) entity of enabling a functional split between a non-real-time (RT) radio access network (RAN) intelligent controller (RIC) and an external artificial intelligence (AI)/machine learning (ML) server, the method comprising:
   during a data collection phase, utilizing a SMO framework and the non-RT RIC to collect and process RAN data and non-RAN data;
   during a data transfer phase, transferring processed RAN and non-RAN data from the SMO entity to an external AI/ML server via an interface;
   during a training model input phase, receiving a trained AI/ML model, metadata, and training results from the external AI/ML server at the SMO entity via an interface; and
   during a configuration phase, using the trained AI/ML model within the SMO entity and the non-RT RIC to transfer configuration parameters to a near-RT RIC.

2. The method of claim 1, wherein transferring processed RAN and non-RAN data comprises:
   transferring pointers to processed RAN and non-RAN data in a data store, wherein the pointers are configured for use in the external AI/ML server to retrieve the processed RAN and non-RAN data.

3. The method of claim 1, wherein the external AI/ML server is a general AI/ML entity, the functional split is enabled between the non-RT RIC and the general AI/ML entity, and the general AI/ML entity trains the AI/ML model.

4. The method of claim 1, further comprising:
   utilizing defined control signaling to collect the RAN data and non-RAN data, wherein the trained AI/ML model and configuration parameters enable intelligent beam management procedures.

5. A method of mediating transfer of enrichment information (EI) at a non-real-time (RT) radio access network (RAN) intelligent controller (RIC) to a near-RT RIC, the method comprising:
   establishing a connection between the non-RT RIC and the near-RT RIC for delivery of the EI;
   determining, by the non-RT RIC, whether the EI satisfies defined bounds; and
   transferring an error notification to the near-RT RIC and removing access of the near-RT RIC to the EI in case that the defined bounds are not satisfied, wherein the EI is generated by a non-RT RIC application (rApp) or received from an external source;
   in case that the EI is received from the external source, transferring the error notification to the external source; and
   in case that the EI is generated by the rApp, suspending the rApp.

6. The method of claim 5, wherein establishing the connection between the non-RT RIC and the near-RT RIC for delivery of the EI comprises establishing the connection for continuous delivery of the EI, the method further comprising:
   determining, by the non-RT RIC, a target set of key performance indicators (KPIs) for the EI;
   continuously transferring the EI from the non-RT RIC to the near-RT RIC;
   monitoring, by the non-RT RIC, the target set of KPIs; and
   determining whether any KPI in the target set of KPIs does not satisfy predefined bounds associated with the KPI.

7. A service management and orchestration (SMO) entity enabling a functional split between a non-real-time (RT) radio access network (RAN) intelligent controller (RIC) and an external artificial intelligence (AI)/machine learning (ML) server, the SMO entity comprising:
   a transceiver; and
   a processor operably coupled to the transceiver, the processor configured to:
      during a data collection phase, operate with the non-RT RIC to collect and process RAN data and non-RAN data,
      during a data transfer phase, transfer processed RAN and non-RAN data from the SMO entity to an external AI/ML server via an interface,
      during a training model input phase, receive a trained AI/ML model, metadata, and training results from the external AI/ML server at the SMO entity via an interface, and
      during a configuration phase, use the trained AI/ML model within the SMO entity and the non-RT RIC to transfer configuration parameters to a near-RT RIC.

8. The SMO entity of claim 7, wherein transferring processed RAN and non-RAN data comprises:
   transferring pointers to processed RAN and non-RAN data in a data store, wherein the pointers are configured for use in the external AI/ML server to retrieve the processed RAN and non-RAN data.

9. The SMO entity of claim 7, wherein the external AI/ML server is a general AI/ML entity, the functional split is enabled between the non-RT RIC and the general AI/ML entity, and the general AI/ML entity trains the AI/ML model.

10. The SMO entity of claim 7, wherein the processor is further configured to:
   utilize defined control signaling to collect the RAN data and non-RAN data,
   wherein the trained AI/ML model and configuration parameters enable intelligent beam management procedures.

11. A non-real-time (RT) radio access network (RAN) intelligent controller (RIC) mediating transfer of enrichment information (EI) to a near-RT RIC, the non-RT RIC comprising:
   a transceiver; and
   a processor operably coupled to the transceiver, the processor configured to:
      establish a connection between the non-RT RIC and the near-RT RIC for delivery of the EI,
      determine, by the non-RT RIC, whether the EI satisfies defined bounds set for the EI,
      transfer an error notification by the non-RT RIC and removing access of the near-RT RIC to the EI in case that the defined bounds are not satisfied, wherein the EI is generated by a non-RT RIC application (rApp) or received from an external source,
      in case that the EI is received from the external source, transfer the error notification to the external source, and
      in case that the EI is generated by the rApp, suspend the rApp.

12. The non-RT RIC of claim 11, wherein establishing the connection between the non-RT RIC and the near-RT RIC for delivery of the EI comprises establishing the connection for continuous delivery of the EI, the processor further configured to:

determine, by the non-RT RIC, a target set of key performance indicators (KPIs) for the EI,
continuously transfer the EI from the non-RT RIC to the near-RT RIC,
monitor, by the non-RT RIC, the target set of KPIs, and
determine whether any KPI in the target set of KPIs does not satisfy predefined bounds associated with the KPI.

* * * * *